United States Patent
Lian et al.

(10) Patent No.: US 12,516,295 B2
(45) Date of Patent: Jan. 6, 2026

(54) GENERATION OF PANCREATIC PROGENITOR CELLS AND BETA CELLS FROM HUMAN PLURIPOTENT STEM CELLS

(71) Applicant: The Penn State Research Foundation, University Park, PA (US)

(72) Inventors: Xiaojun Lian, State College, PA (US); Chuanxin Chen, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1092 days.

(21) Appl. No.: 17/269,233

(22) PCT Filed: Aug. 22, 2019

(86) PCT No.: PCT/US2019/047735
§ 371 (c)(1),
(2) Date: Feb. 17, 2021

(87) PCT Pub. No.: WO2020/041608
PCT Pub. Date: Feb. 27, 2020

(65) Prior Publication Data
US 2021/0324337 A1    Oct. 21, 2021

Related U.S. Application Data

(60) Provisional application No. 62/840,444, filed on Apr. 30, 2019, provisional application No. 62/721,388, filed on Aug. 22, 2018.

(51) Int. Cl.
*C12N 5/071* (2010.01)
*A61K 35/39* (2015.01)

(52) U.S. Cl.
CPC ............ *C12N 5/0678* (2013.01); *A61K 35/39* (2013.01); *C12N 2500/38* (2013.01); *C12N 2500/92* (2013.01); *C12N 2501/15* (2013.01); *C12N 2501/155* (2013.01); *C12N 2501/385* (2013.01); *C12N 2501/41* (2013.01); *C12N 2501/415* (2013.01); *C12N 2501/42* (2013.01); *C12N 2501/727* (2013.01); *C12N 2501/999* (2013.01); *C12N 2506/02* (2013.01); *C12N 2506/45* (2013.01)

(58) Field of Classification Search
CPC .............. C12N 5/0678; C12N 2500/92; C12N 2501/155; C12N 2501/41; C12N 2501/415; C12N 2501/42; C12N 2506/02; C12N 2506/45; A61K 35/39
See application file for complete search history.

(56) References Cited

U.S. PATENT DOCUMENTS

| | | | | |
|---|---|---|---|---|
| 2015/0247123 A1* | 9/2015 | Ekberg | ................ | C12N 5/0678 435/377 |
| 2016/0177267 A1* | 6/2016 | Melton | ................ | C12N 5/0676 435/377 |
| 2017/0081639 A1 | 3/2017 | Kume et al. | | |
| 2018/0016556 A1* | 1/2018 | Han | .................... | C12N 5/0676 |

OTHER PUBLICATIONS

Loh, Kyle M., et al. "Efficient endoderm induction from human pluripotent stem cells by logically directing signals controlling lineage bifurcations." Cell stem cell 14.2 (2014): 237-252. (Year: 2014).*
Memon et al. Enhanced differentiation of human pluripotent stem cells into pancreatic 1-6, 16-17 progenitors co-expressing PDX1 and NKX6.1, Stem Cell Research & Therapy, Jan. 23, 2018, vol. 9, No. 15 (Year: 2018).*
Bao, Xiaoping, et al. "Chemically-defined albumin-free differentiation of human pluripotent stem cells to endothelial progenitor cells." Stem cell research 15.1 (2015): 122-129. (Year: 2015).*
Pagliuca, Felicia W., et al. "Generation of functional human pancreatic β cells in vitro." Cell 159.2 (2014): 428-439. (Year: 2014).*
Siller, Richard, et al. "Small-molecule-driven hepatocyte differentiation of human pluripotent stem cells." Stem cell reports 4.5 (2015): 939-952. (Year: 2015).*
Rezania, Alireza, et al. "Reversal of diabetes with insulin-producing cells derived in vitro from human pluripotent stem cells." Nature biotechnology 32.11 (2014): 1121-1133. (Year: 2014).*
Boergermann, J. H., et al. "Dorsomorphin and LDN-193189 inhibit BMP-mediated Smad, p38 and Akt signalling in C2C12 cells." The international journal of biochemistry & cell biology 42.11 (2010): 1802-1807. (Year: 2010).*
Pagliuca, F.W., et al., Generation of Functional Human Pancreatic β Cells In Vitro, Cell, Oct. 9, 2014, vol. 159, No. 2, pp. 428-439.
Rezania, A., et al., Reversal of diabetes with insulin-producing cells derived in vitro from human pluripotent stem cells, Nature Biotechnology, Sep. 11, 2014, vol. 21, pp. 1121-1133.
Rezania, A., et al., Maturation of Human Embryonic Stem Cell-Derived Pancreatic Progenitors Into Functional Islets Capable of Treating Pre-existing Diabetes in Mice, Diabetes, Aug. 2012, vol. 61, No. 8, pp. 2016-2029.
Xu, X., et al., Activin, BMP and FGF pathways cooperate to promote endoderm and pancreatic lineage cell differentiation from human embryonic stem cells, Mechanisms of Development, Aug. 10, 2011, vol. 128, issues 7-10, pp. 412-427.
Loh, K.M., et al., Efficient Endoderm Induction from Human Pluripotent Stem Cells by Logically Directing Signals Controlling Lineage Bifurcations, Cell Stem Cell, Feb. 6, 2014, vol. 14, No. 2, pp. 237-252.

(Continued)

*Primary Examiner* — Christopher M Babic
*Assistant Examiner* — Michael Angelo Riga
(74) *Attorney, Agent, or Firm* — Hodgson Russ LLP

(57) ABSTRACT

Provided are methods, compositions and kits for generating beta cells from pluripotent stem cells under growth-factor free, defined culture conditions. The beta cells can be generated under conditions that are free of animal products. The generated beta cells secrete insulin, not glucagon, and the amount of insulin secreted is dependent upon the level of glucose stimulus.

4 Claims, 10 Drawing Sheets

(56) References Cited

OTHER PUBLICATIONS

Memon, B., et al., Enhanced differentiation of human pluripotent stem cells into pancreatic progenitors co-expressing PDX1 and NKX6.1, Stem Cell Research & Therapy, Jan. 23, 2018, vol. 9, No. 15, pp. 1-15.

Bao, X., et al., Chemically-defined albumin-free differentiation of human pluripotent stem cells to endothelial progenitor cells, Stem Cell Research, May 14, 2015, vol. 15, No. 1, pp. 122-129.

Kondo, Y. et al., Identification of a small molecule that facilitates the differentiation of human iPSCs/ESCs and mouse embryonic pancreatic explants into pancreatic endocrine cells, Diabetologia, May 22, 2017, pp. 1454-1466, vol. 60.

Wachs, F.-P., et al., High Efficacy of Clonal Growth and Expansion of Adult Neural Stem Cells, Laboratory Investigation, Jul. 1, 2003, pp. 949-962, vol. 83.

\* cited by examiner

D

E

A

B

C

D

E

GENERATION OF PANCREATIC PROGENITOR CELLS AND BETA CELLS FROM HUMAN PLURIPOTENT STEM CELLS

CROSS REFERENCE TO RELATED APPLICATIONS

The present application is a 35 U.S.C. 371 national stage filing of the International Application No. PCT/US19/47735, filed Aug. 22, 2019, which claims priority to U.S. Provisional application No. 62/721,388, filed on Aug. 22, 2018, and U.S. Provisional application No. 62/840,444, filed on Apr. 30, 2019, the disclosures of which are incorporated herein by reference.

BACKGROUND OF THE DISCLOSURE

The pancreas is central to the control of energy consumption and metabolism, responsible for secreting hormones necessary to regulate blood glucose levels, as well as producing enzymes for digestion. The pancreas is composed of two morphologically and functionally distinct components: the exocrine pancreas (acinar cells and ductal cells) and the endocrine pancreas (islets of Langerhans). The endocrine cells are localized to the islets of Langerhans and are responsible for secreting different hormones. Glucagon is secreted by α cells and is responsible for increasing the concentration of glucose in the blood when necessary. Somatostatin inhibits insulin and glucagon and is secreted by δ cells. Pancreatic polypeptide is secreted by γ cells or PP cells and is responsible for regulating food intake, and ghrelin is secreted by ε cells in response to hunger.

Insulin is secreted by beta cells and is a prominent pancreatic hormone necessary to regulate glucose homeostasis. Transcription of the insulin gene results in translation of a protein called preproinsulin. Once the N-terminus has been removed, preproinsulin becomes proinsulin. The C-peptide is then cut off from proinsulin to generate insulin, which is stored in the secretory granules of beta cells. As C-peptide is a byproduct of insulin production indicating successful post-translational modification, it is a useful marker for determining beta cell identity during human stem cell differentiation.

Diabetes is a pandemic disease of the modern era. In the United States, approximately 30.3 million people have diabetes, which represents 9.4% of the population (Gruessner et al., Gastroenterol. Clin. North Am. 2018 June; 47(2):417-441). Type 1 diabetes (T1D), is diagnosed in children and young adults and accounts for approximately 5% to 10% of people with diabetes (Yoon et al., Am. J. Ther. 2005; 591:580-591). T1D results from insulin deficiency caused by the loss of beta cells, which may be as the result of an aberrant autoimmune response. Due to the destruction of the beta cell population, the secretion of insulin dramatically decreases, keeping glucose from entering the cells from the bloodstream, resulting in hyperglycemic blood glucose levels. If untreated, patients with T1D can die prematurely or have prolonged ill health due to severe complications.

Currently, methods to treat T1D include injection of insulin or pancreatic islet transplantation. However, injecting insulin does not cure the disease and it requires patients to monitor their blood glucose levels at all time, and while cadaveric islet transplantation can be beneficial in patients with T1D, with some patients remaining free from insulin use for years, there is a shortage of pancreatic islets available and it requires lifetime immunosuppressive therapy to allow transplanted islet cell survival. As a result, many researchers and clinicians are looking towards stem cell engineering and regenerative medicine strategies to identify a viable alternative source of functional beta cells.

In initial studies of generating pancreatic cells from human pluripotent stem cells (hPSCs), several step-wise protocols were developed using combinations of growth factors and small molecules to guide hPSC differentiation through four successive stages (definitive endoderm, pancreatic progenitors, endocrine progenitors, and beta cells) (Bruin et al., Stem Cell Res. 2014 January; 12(1):194-208; Bruin et al., Diabetologia 2013 September; 56(9):1987-1998; Rezania et al., Diabetes 2012 August; 61(8):2016-2029; Rezania et al., Stem Cells 2013 November; 31(11):2432-2442; Rezania et al., Diabetes 2011 January; 60(1):239-247; Xu et al., Mech. Dev. 2011 September; 128(7-10):412-427; Shim et al., Diabetologia 2007 May; 50(6):1228-1238; Cho et al. Diabetologia 2012 December; 55(12):3284-3295; D'Amour et al., Nat. Biotechnol. 2006; 24(11):1392-1401; Kroon et al., Nat. Biotechnol. 2008; 26(4):443-452; Nostro et al., Development 2011 March; 138(5):861-871; Kelly et al., Nat. Biotechnol. 2011 August; 29(8):750-756; Pagliuca et al., Cell 2014; 159(2):428-439; Rezania et al., Nat. Biotechnol. 2014 November; 32(11):1121-1133). Though functional beta cells with morphological and functional resemblance to primary beta cells could be generated with more complicated protocols (Pagliuca et al., Cell 2014; 159(2):428-439; Rezania et al., Nat. Biotechnol. 2014 November; 32(11):1121-1133), production of beta cells using these protocols exhibits low differentiation efficiency and is currently extremely expensive because these protocols require high concentration of expensive growth factors. For instance, it is difficult to manufacture patient-specific products because it will require optimization of differentiation conditions for every batch of induced pluripotent stem cells (iPSCs), adding substantial costs and operational burden to the process. Therefore, current beta cell differentiation is cost prohibitive for the large number of people who might benefit from these treatments. Further, inclusion of growth factors in the process of generating beta cells may trigger unintended and untimely pathways within a cell.

SUMMARY OF THE DISCLOSURE

This disclosure provides methods and compositions for generating pancreatic progenitor cells and beta cells from pluripotent stem cells under growth-factor free, defined culture conditions. The pancreatic progenitor cells can be induced to differentiate into beta cells.

In an aspect, this disclosure provides a method of generating a population of beta cells from pluripotent stem cells under growth-factor free, defined culture conditions comprising: i) contacting pluripotent stem cells with a cell culture composition whereby Wnt signaling is activated and BMP signaling is inhibited to generate definitive endoderm cells, ii) contacting the definitive endoderm cells with a cell culture composition whereby Wnt signaling is activated, BMP signaling is inhibited, followed by a cell culture composition whereby Hedgehog signaling is inhibited, Retinoic Acid signaling is activated, Protein Kinase C is activated, and BMP signaling is inhibited to generate pancreatic progenitor 1 (PP1) cells, iii) contacting the PP1 cells with a cell culture composition whereby BMP signaling is inhibited, ROCK signaling is inhibited, and Nicotinamide is included to generate pancreatic progenitor 2 (PP2) cells, and iv) contacting the PP2 cells with a cell culture composition whereby Hedgehog signaling is inhibited, Retinoic Acid signaling is activated, Notch signaling is inhibited, TGF-beta signaling is inhibited, and 3,3',5-Triiodo-L-thyronine (T3), Heparin, and Zinc Sulfate are included to generate endocrine progenitor (EP) cells, and v) contacting the EP cells with a defined cell culture medium to generate beta cells. One or more of the above steps i), ii), iii), iv) and v) are carried out under growth factor-free, defined culture conditions. In an embodiment, all of the steps i), ii), iii), and iv) are carried out under growth factor-free, defined culture conditions. In an embodiment, all of the steps i), ii), iii), iv) and v) are carried out under growth factor-free, defined culture conditions. In an embodiment, at no time during the process of generation of beta cells from PSCs are the cells exposed to any growth factor either in the culture medium or via substrates or feeder layers on which the cells may be cultured.

In an embodiment, the pluripotent stem cells are contacted with CHIR99021 and Dorsomorphin under growth factor-free, defined culture conditions for a period of about 1 to 4 days to obtain a first population of cells comprising definitive endoderm (DE) cells, the DE cells are contacted with CHIR99021, Dorsomorphin under growth factor-free, defined culture conditions for a period of about 1 to 4 days and then with Retinoic acid, Dorsomorphin, phorbol 12,13-dibutyrate (PDBu) and SANT-1 under growth factor-free, defined culture conditions for a period of about 1 to 6 days to obtain a second population of cells comprising PP1 cells, the PP1 cells are contacted with Dorsomorphin, Y27632, Nicotinamide under growth factor-free, defined culture conditions for a period of about 2 to 6 days to obtain a third population of cells comprising PP2 cells, and the PP2 cells are contacted with SANT-1, γ-Secretase Inhibitor XXI, RepSox, T3, heparin, and Zinc Sulfate under growth factor-free, defined culture conditions for a period of 7 to 10 days to obtain a fourth population of cells comprising endocrine progenitor (EP) cells. The EP cells are contacted with a serum-free, growth-factor-free medium for a period of 10 to 20 days to generate a fifth population of cells comprising beta cells. In an embodiment, the culture medium contains only the specifically recited activators or inhibitors of the particular pathways, and the specific additional listed components.

In contrast to previously known processes which require growth factors and exhibit low differentiation efficiency, the present disclosure provides growth-factor free methods for generating: DE cells from PSCs, PP1 cells from DE cells, PP2 cells from PP1 cells, EP cells from PP2 cells, and beta cells from EP cells. The present methods are cost-effective relative to processes where growth factors and/or serum products are used, are reproducible because of the defined culture conditions, and have a high efficiency for generation of DE cells, PP1 and PP2 cells, EP cells and beta cells suitable for research and diabetes treatment. Instead of using growth factors, the present method uses small molecule modulation of key cell signaling pathways. The present protocols can be easily scaled-up.

The beta cells generated by the present methods are similar to mature beta cells. These cells secrete insulin, but not glucagon. They are capable of glucose stimulated insulin secretion and the amount of insulin secreted is dependent upon the magnitude of glucose stimulation. As such, the beta cells generated by the present methods mimic the functions of mature beta cells and can be used for replacement therapy.

In an aspect, this disclosure provides populations of cells generated under growth factor-free, defined conditions, and which are present in compositions which are growth factor-free and defined. The populations of cells are made up of at least 50%, 60%, 70%, 80%, 90%, 95%, 96%, 97%, 98% or 99% of DE cells, PP cells (PP1 or PP2), EP cells. In the case of beta cells, the population of cells are made up of at least 5%, 10%, 20%, or 30% beta cells. The cells can be frozen for later use or may be used upon generation for implantation into an individual who is in need of treatment for deficiency of beta cell function, such as an individual afflicted with type 1 diabetes.

In an aspect, this disclosure provides kits for generation of definitive endoderm cells, pancreatic progenitor cells, endocrine progenitor cells, and/or beta cells from pluripotent stem cells under growth factor-free, defined culture conditions. The kit comprises growth factor-free regents for one or more of the steps in the differentiation of PSCs to beta cells, suitable buffers, and optionally instructions for each step.

DETAILED DESCRIPTION OF THE DISCLOSURE

Figure 1:
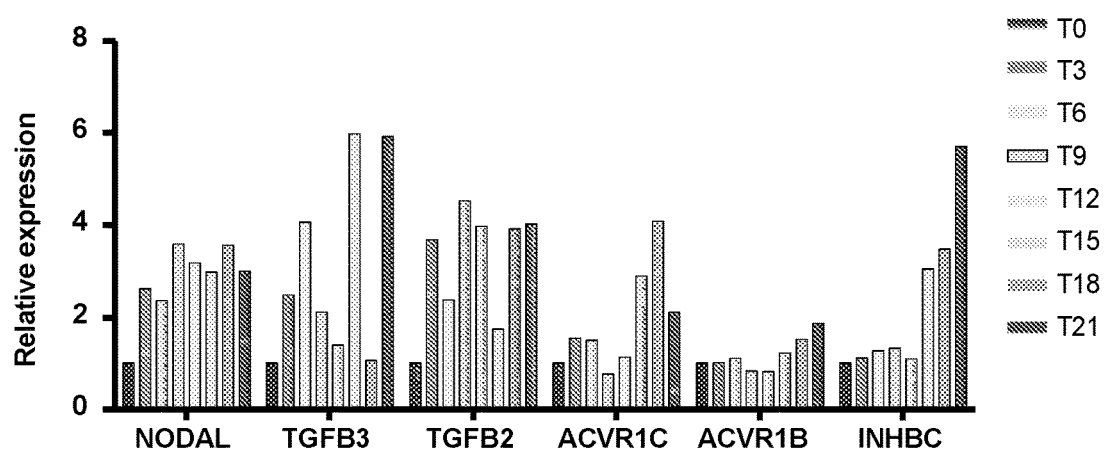
FIG. 1. Growth-factor-free differentiation of SOX17+ DE cells from hPSCs via CH and DM treatment. (A) Human 19-9-11 iPSCs were treated with 6 μM CH at day 0. After treatment, cells were collected from 3 to 21 hours (T) and RNA-seq was performed. The bars for each set from left to right are: T0, T3, T6, T9, T12, T15, T18, T21. (B) Schematic of protocol for defined, growth-factor-free differentiation of hPSCs to SOX17+ cells via treatment with CH and DM. (C-D) H1 hESCs were cultured as indicated in 2B with 1 μM DM plus different CH concentration, ranging from 2 to 10 μM. (C) On day 4 of differentiation, cells were analyzed for SOX17 expression by flow cytometry. (D) Cells were immunostained with a SOX17 antibody on day 4 of differentiation under 6 μM CH plus 1 μM DM treatment. (E) H1 hESCs were differentiated with CH in the presence or absence of DM. From day 1 to day 4, cells were analyzed for SOX17 expression by flow cytometry. (F) H1 hESCs were differentiated with CH, CH plus DM or CH plus A83-01. On day 4 of differentiation, cells were analyzed for SOX17 expression by flow cytometry.
Figure 1:
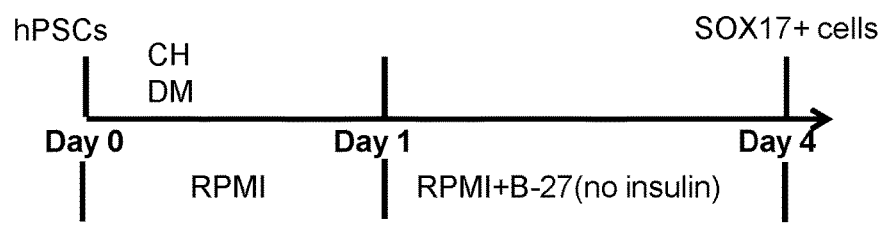
Figure 1:
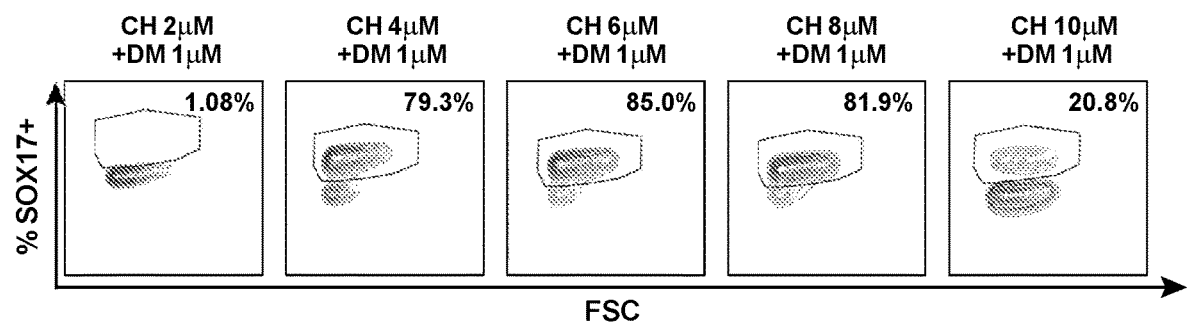
Figure 1:
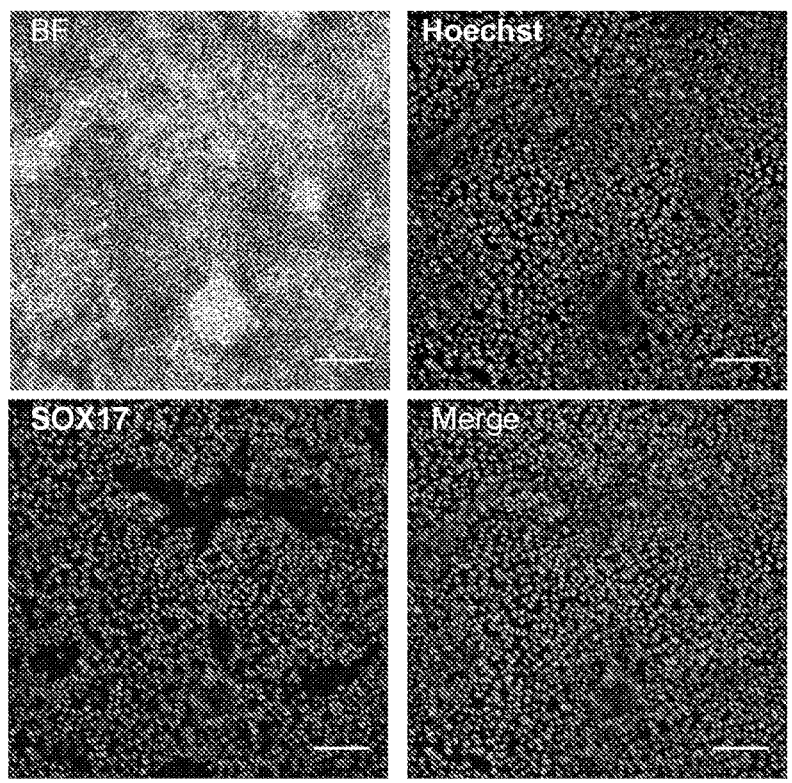
Figure 1:
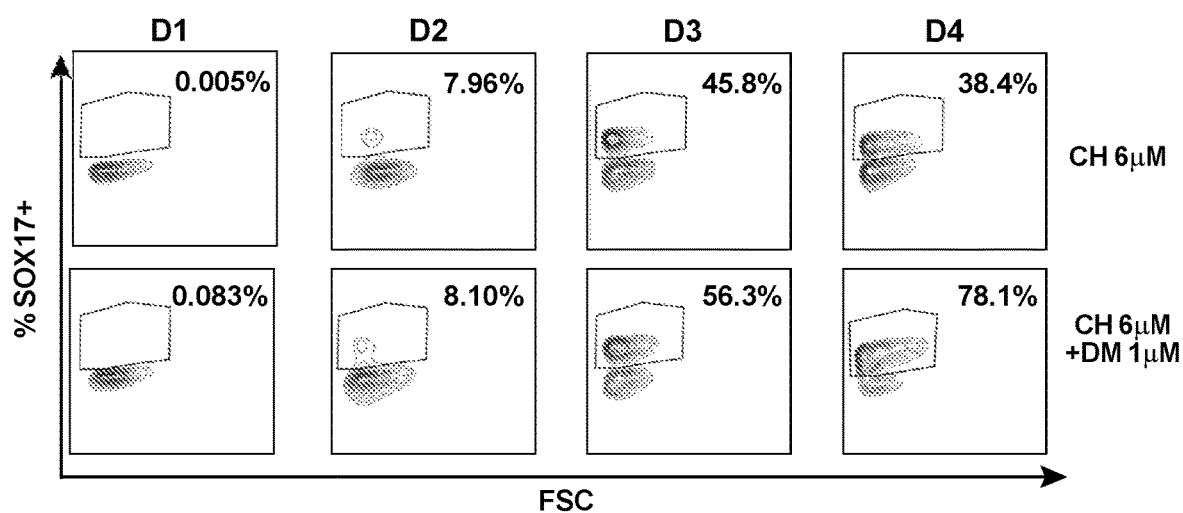
Figure 1:
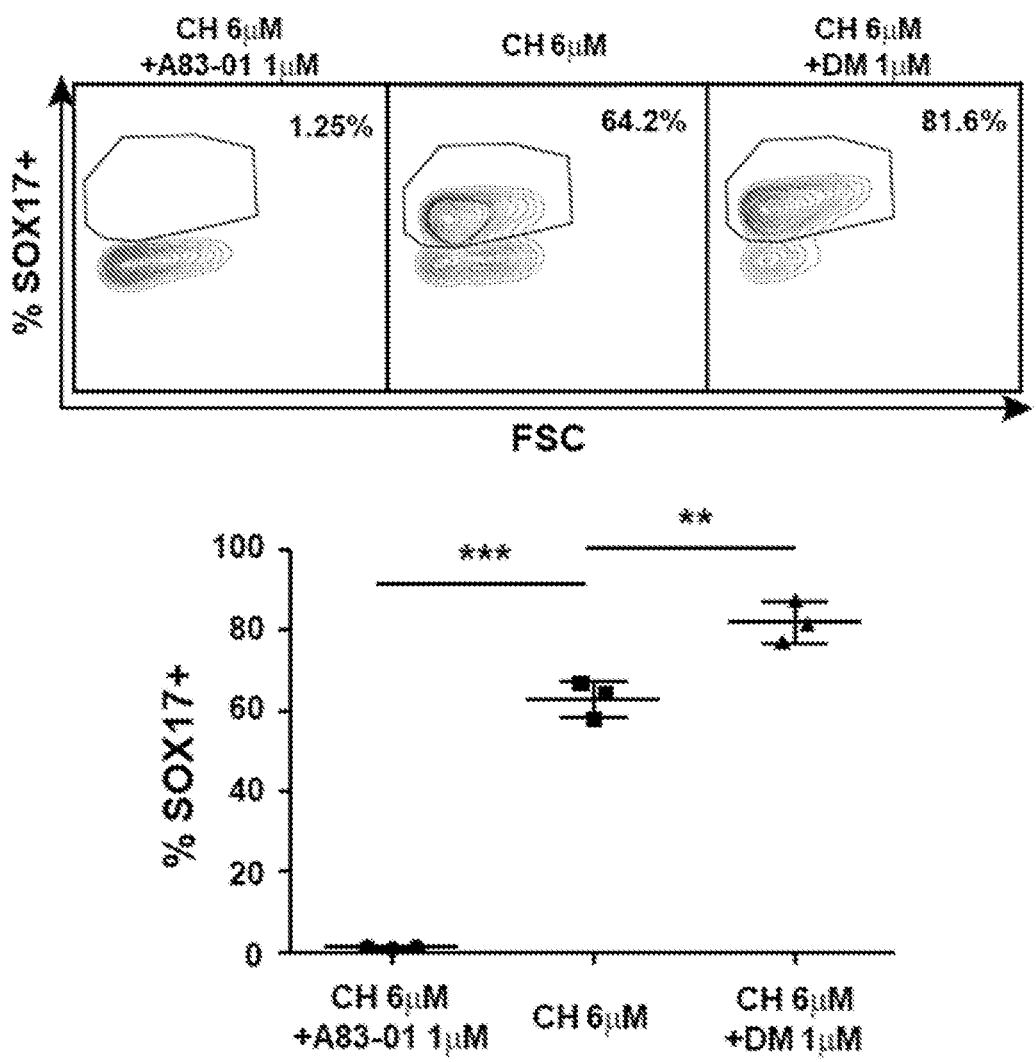

Unless defined otherwise, all technical and scientific terms used herein have the same meaning as commonly understood by one of ordinary skill in the art to which this disclosure belongs.

Every numerical range given throughout this specification includes its upper and lower values, all values to the tenth of the lower value, as well as every narrower numerical range that falls within it, as if such narrower numerical ranges were all expressly written herein.

As used in this disclosure including the claims, the singular forms "a", "an", and "the" include plural references unless the context clearly dictates otherwise. Thus, for example, references to "the method" includes one or more methods, and/or steps of the type described herein.

The term "defined" as used herein as applied to culture medium or storage medium or culture conditions indicates that the identity and quantity of each component in the medium is known.

The term "growth factor-free" as applied to culture media or storage media and culture conditions as used herein indicates the medium contains no added serum or growth factors.

The term "growth factor(s)" as used herein means a naturally occurring protein capable of stimulating cellular growth, proliferation and differentiation. For example, the term growth factor includes insulin, insulin like growth factors I and II, epidermal growth factor (EGF), including Amphiregulin, Betacellulin, Epigen, Epiregulin, HB-EGF, LRIG1, LRIG2, and LRIG3, fibroblast growth factors (FGFs), Activin A, growth differentiation factors (GDFs), Bone morphogenetic proteins (BMPs), and Wnt ligands (Wnt-1, Wnt-2, Wnt-2b, Wnt-3a, Wnt-4, Wnt-5a, Wnt-5b, Wnt-6, Wnt-7a, Wnt-7b, Wnt-8a, Wnt-8b, Wnt-9a, Wnt-9b, Wnt-10a, Wnt-10b, Wnt-11, and Wnt-16b), and Vascular endothelial growth factor.

The term "pluripotent stem cell" (also referred to as "PSC") as used herein refers to a cell having an ability to differentiate into any type of cell of an adult (pluripotency) and also having self-renewal capacity which is an ability to maintain the pluripotency during cell division. "PSCs" include Embryonic Stem Cells (ESCs), which are derived from inner cell mass of blastocysts or morulae, including cells that have been serially passaged as cell lines. Embryonic stem cells, regardless of their source or the particular method used to produce them, can be identified based on their ability to differentiate into cells of all three germ layers, expression of at least Oct4 and alkaline phosphatase, and ability to produce teratomas when transplanted into immunodeficient animals. The term PSCs also includes induced PSCs (iPSCs), which are cells converted from somatic cells by a variety of methods, such as a transient overexpression of a set of transcription factors. A PSC may be a cell of any species with no limitation, and preferably a mammalian cell. It may be a rodent or primate cell. For example, it may be a monkey, mouse or a human pluripotent stem cell. The term "human pluripotent stem cells" or hPSCs includes human embryonic stem cells and human induced PSCs. Human embryonic stem cells may be obtained from established lines of human embryonic stem cells or human embryonic germ cells, such as, for example the human embryonic stem cell lines H1, H7, and H9 (WiCell).

iPSCs can be generated by reprogramming adult cells using lentivirus or plasmids. Any type of human somatic cells (e.g. skin fibroblasts or cells from a biological fluid) can be reprogrammed to iPSC using lentivirus (Maherali et al. *Cell Stem Cell* 3, 340-345 (2008)) or plasmids (Okita et al. *Nat. Methods* 8, 409-412 (2011)). For example, human dermal fibroblasts can be infected for a suitable period of time (such as 16 hr) with lentiviruses to express the following: hOct4, hSox4, hKlf4, hNanog, and c-Myc, at specific times. Infected cells can be plated on feeder cells in suitable culture media, and transgenes can be induced. Clones with hESC morphology generally appear after about 3 weeks.

In an embodiment, the disclosure provides a method of generating a population of beta cells from pluripotent stem cells comprising sequentially: i) activating Wnt signaling and inhibiting BMP signaling; ii) continuing activating Wnt signaling and inhibiting BMP signaling, and further inhibiting Hedgehog signaling and activating retinoic signaling; iii) continuing inhibiting BMP signaling, and further inhibiting ROCK signaling; and iv) inhibiting Hedgehog signaling, activating retinoic acid signaling, inhibiting Notch signaling, and inhibiting TGFβ signaling. Agents may be added to the steps in addition to those that activate or inhibit the indicated signaling. For example, in step iii) nicotinamide may also be used, and in step iv) T3 may also be used. In an embodiment, in step ii) the cells are first exposed to inhibitor of BMP signaling and activator of Wnt signaling, and then exposed to inhibitor of BMP signaling and inhibitor of Hedgehog signaling. Following step iv), the cells can be cultured in growth-factor free, serum free (defined) medium without any activators or inhibitors of pathways used in the previous steps to obtain beta cells. For example, the growth-factor, defined medium for the final step of generating beta cells can be without: activator of Wnt signaling, inhibitor of BMP signaling, inhibitor of Hedgehog signaling, activator of retinoic acid signaling, inhibitor of ROCK signaling, inhibitor of NOTCH signaling, inhibitor of TGF-β signaling, nicotinamide, T3, heparin and zinc sulfate. In an embodiment, only the recited pathways are activated or inhibited for the different steps.

In an embodiment, the disclosure provides a method of generating a population of definitive endoderm cells from pluripotent stem cells under growth-factor free, defined culture conditions comprising contacting pluripotent stem cells with a composition whereby Wnt signaling is activated and BMP signaling is inhibited. For example, the generation of definitive endoderm cells from pluripotent stem cells can be carried out in a growth factor-free, defined, culture medium comprising at least one agent that activates Wnt signaling and at least one agent that inhibits BMP signaling. In an embodiment, DE differentiation can be achieved with only Wnt activation, without BMP signaling inhibition. The presence of BMP signaling, inhibition, however, increases DE differentiation efficiency. BMP signaling inhibition alone does not generate DE cells from PSCs. The presence of definitive endoderm cells may be identified by the presence of specific markers, such as, for example, SOX17.

In an embodiment, the disclosure provides a method of generating a population of pancreatic progenitor cells from definitive endoderm cells under growth-factor free, defined culture conditions comprising contacting the definitive endoderm cells with a composition whereby Wnt signaling is activated, BMP signaling is inhibited, and Hedgehog signaling is inhibited, and wherein the cells may also be exposed to retinoic acid, or an activator of retinoic acid signaling. For example, the generation of pluripotent pancreatic cells from definitive endoderm cells can be carried out in a growth factor-free, defined, culture medium comprising at least one agent that activates Wnt signaling, at least one agent that inhibits BMP signaling, at least one agent that inhibits Hedgehog signaling, and retinoic acid or an activator of retinoic acid signaling. The presence of pancreatic progenitor cells may be identified by the presence of specific markers, such as, for example, PDX1.

In an embodiment, the disclosure provides a method of generating a population of pancreatic progenitor 2 (PP2) cells from pancreatic progenitor 1 cells under growth factor-free, defined culture conditions comprising contacting the pancreatic progenitor cells with a composition whereby BMP signaling is inhibited, ROCK signaling is inhibited, and wherein the cells may also be exposed to nicotinamide. In an embodiment, the generation of endocrine progenitor cells from pancreatic progenitor cells can be carried out in a growth factor-free, defined culture medium comprising nicotinamide, at least one agent that inhibits BMP signaling, and at least one agent that inhibits ROCK signaling. The presence of endocrine progenitor cells may be identified by the presence of specific markers, such as, for example, NKX6.1.

In an embodiment, the disclosure provides a method of generating a population of beta cells from PP2 cells under growth-factor free, defined culture conditions comprising contacting the PP2 cells with a composition whereby Hedgehog signaling is inhibited, Retinoic Acid signaling is activated, Notch signaling is inhibited, TGF-beta signaling is inhibited, and wherein the culture medium also comprises T3, heparin, and Zinc Sulfate. This generates EP cells after about a week, which can then be cultured under growth-factor free, defined culture conditions (without any other activators of Wnt, RA, or PKC pathways, or inhibitors of BMP, Hedgehog, ROCK, NOTCH, or TGF-beta pathways, or T3, heparin or zinc sulfate) for another about 10 days to generate beta cells. The presence of beta cells may be identified by the presence of specific markers, such as, for example, proinsulin.

In an embodiment, the disclosure provides a method of generating a population of pancreatic progenitor cells from pluripotent stem cells under growth-factor free, defined culture conditions comprising contacting pluripotent stem cells with a composition whereby Wnt signaling is activated and BMP signaling is inhibited to generate definitive endoderm cells, and contacting the definitive endoderm cells with a composition whereby Wnt signaling is activated, BMP signaling is inhibited and Hedgehog signaling is inhibited, and wherein the composition optionally also comprises retinoic acid or an agent that activates retinoic acid signaling.

In an embodiment, the disclosure provides a method of generating a population of endocrine progenitor cells from definitive endoderm cells under growth-factor free, defined culture conditions comprising contacting the definitive endoderm cells with a composition whereby Wnt signaling is activated, BMP signaling is inhibited, and Hedgehog signaling is inhibited, and wherein the composition may also comprise retinoic acid or an activator of retinoic acid signaling to generate pancreatic progenitor cells, and contacting the pancreatic progenitor cells with a composition optionally comprising nicotinamide and whereby BMP signaling is inhibited and ROCK signaling is inhibited to generate endocrine progenitor cells.

In an embodiment, the disclosure provides a method of generating a population of beta cells from pancreatic progenitor cells under growth-factor free, defined culture conditions comprising contacting the pancreatic progenitor cells with a composition optionally comprising nicotinamide, and whereby BMP signaling is inhibited to obtain endocrine progenitor cells, and contacting the endocrine progenitor cells with a composition comprising T3, and whereby Hedgehog signaling is inhibited, retinoic acid (RA) signaling is activated, Notch signaling is inhibited, and TGF-beta signaling is inhibited.

In an embodiment, the disclosure provides a method of generating a population of endocrine progenitor cells from pluripotent stem cells under growth-factor free, defined culture conditions comprising contacting pluripotent stem cells with a composition whereby Wnt signaling is activated and BMP signaling is inhibited to generate definitive endoderm cells, contacting the definitive endoderm cells with a composition whereby Wnt signaling is activated, BMP signaling is inhibited, and Hedgehog signaling is inhibited, and wherein the composition may also comprise retinoic acid or activator of RA signaling to generate pancreatic progenitor cells, and contacting the pancreatic progenitor cells with a composition whereby BMP signaling is inhibited, ROCK signaling is inhibited and wherein the composition may also comprise nicotinamide to generate endocrine progenitor cells.

In an embodiment, the disclosure provides a method of generating a population of beta cells from definitive endoderm cells under growth-factor free, defined culture conditions comprising contacting the definitive endoderm cells with a composition whereby Wnt signaling is activated, BMP signaling is inhibited, and Hedgehog signaling is inhibited, and wherein the composition may also comprise retinoic acid or an activator of RA signaling to generate pancreatic progenitor cells, and contacting the pancreatic progenitor cells with a composition whereby BMP signaling is inhibited, ROCK signaling is inhibited and wherein the composition may also comprise nicotinamide to generate endocrine progenitor cells, and contacting the endocrine progenitor cells with a composition whereby Hedgehog signaling is inhibited, Retinoic Acid signaling is activated, Notch signaling is inhibited, TGF-beta signaling is inhibited, and wherein the composition may also comprise T3 to generate beta cells.

In an embodiment, the disclosure provides a method of generating a population of beta cells from pluripotent stem cells under growth-factor free, defined culture conditions comprising contacting pluripotent stem cells with a composition whereby Wnt signaling is activated and BMP signaling is inhibited to generate definitive endoderm cells, contacting the definitive endoderm cells with a composition whereby Wnt signaling is activated, BMP signaling is inhibited, and Hedgehog signaling is inhibited, and wherein the composition may also comprise retinoic acid or activator of retinoic acid signaling to generate pancreatic progenitor cells, contacting the pancreatic progenitor cells with a composition whereby BMP is inhibited, ROCK signaling is inhibited and wherein the composition may also comprise nicotinamide to generate endocrine progenitor cells, and contacting the endocrine progenitor cells with a composition whereby Hedgehog signaling is inhibited, Retinoic Acid signaling is activated, Notch signaling is inhibited, TGF-beta signaling is inhibited, and wherein the composition may also comprise T3 is to generate beta cells.

The steps of generating DE cells from PSCs, PP cells from DE cells, EP cells from PP cells and beta cells from EP cells can be carried out without any intervening step or time, or an intervening step can be added between one or more steps where the intervening step may contain only the basic culture medium, which is also growth factor free and defined, and also does not contain any activator or inhibitor of the signaling pathway from the preceding or subsequent steps. The intervening step or steps may be considered as washing steps to remove the inhibitors or activators of the signaling pathway from the preceding step.

The steps of generating beta cells from PSCs (with or without intervening washing steps) can be carried out continuously or cultured cells at each stage can be frozen, and then thawed and the process can be resumed. For example, a population of DE cells, PP cells, EP cells, or beta cells can be collected and frozen in any cell cryopreservation medium known in the art by known methods. The cells are preferably frozen and thawed without the use of growth factors, in defined culture conditions.

The pluripotent stem cells can be passaged and when they are about 60-70% confluent, they can be subjected to the steps of the present disclosure. In the conversion of pluripotent stem cells to definitive endoderm cells, the PSCs can be subjected to activation of Wnt signaling and BMP inhibition for a period of about 1-12 days and all hours and intervals therebetween), e.g., 1 day, 2 days, 3 days, 4, days, 5 days, 6 days, 7 days, 8 days, 9 days, 10 days, 11 days or 12 days wherein the Wnt signaling is activated and BMP signaling is inhibited to generate DE cells. The DE cells can be subjected to activation of Wnt signaling, BMP signaling inhibition, retinoic acid signaling activation, and Hedgehog inhibition for a period of about 1-7 days and all hours and intervals therebetween e.g., 1 day, 2 days, 3 days, 4 days, 5 days, 6 days or 7 days to generate PP1 cells. The PP1 cells can be subjected to BMP signaling inhibition and ROCK signaling inhibition for about 2 to 6 days and all hours and intervals therebetween e.g., 2 days, 3 days, 4 days, 5 days and 6 days to generate PP2 cells. The PP2 cells can be subjected to inhibition of Hedgehog signaling, activation of retinoic acid signaling, inhibition of Notch signaling, and inhibition of TGF-beta signaling for 5 to 10 days to generate EP cells and then EP cells can be cultured under serum-free, growth factor free media for about 10-20 days to generate beta cells. In an embodiment, PP1 cells are obtained on about $10^{th}$-$11^{th}$ day, PP2 cells are obtained on about $14^{th}$-$15^{th}$ day, EP cells are obtained from about $20^{th}$ to $24^{th}$ days and beta cells are obtained on about the $30^{th}$ day (starting from pluripotent stem cells). The beta cells can be continued in culture for at least up to $60^{th}$ day.

The cells on the $14^{th}$ or $15^{th}$ day (starting from pluripotent stem cells) may be considered as early EP cells or late pancreatic progenitor cells. As such, these cells may be termed pancreatic progenitor 2 (PP2) cells, with the cells on $20^{th}$ to $24^{th}$ day being termed as EP cells.

In an embodiment, this disclosure provides a method of generating a population of beta cells from pluripotent stem cells under growth-factor free, defined culture conditions comprising: i) contacting pluripotent stem cells with a cell culture composition whereby Wnt signaling is activated and BMP signaling is inhibited to generate definitive endoderm cells, ii) contacting the definitive endoderm cells with a cell culture composition whereby Wnt signaling is activated, BMP signaling is inhibited, followed by a cell culture composition whereby Hedgehog signaling is inhibited, Retinoic Acid signaling is activated, and BMP signaling is inhibited to generate pancreatic progenitor cells, iii) contacting the pancreatic progenitor cells with a cell culture composition whereby BMP signaling is inhibited, ROCK signaling is inhibited, and nicotinamide is included to generate endocrine progenitor cells, and iv) contacting the endocrine progenitor cells with a cell culture composition whereby Hedgehog signaling is inhibited, Retinoic Acid signaling is activated, Notch signaling is inhibited, TGF-beta signaling is inhibited, and 3,3',5-Triiodo-L-thyronine (T3) is included to generate beta cells. One or more of the above steps i), ii), iii), and iv) are carried out under growth factor-free, defined culture conditions. In an embodiment, all of the steps i), ii), iii), and iv) are carried out under growth factor-free, defined culture conditions. In an embodiment, at no time during the process of generation of beta cells from PSCs are the cells exposed to any growth factor either in the culture medium or via substrates or feeder layers on which the cells may be cultured. In an embodiment, the pluripotent stem cells are contacted with CHIR99021 and Dorsomorphin under growth factor-free, defined culture conditions for a period of about 1 to 4 days to obtain a first population of cells comprising definitive endoderm (DE) cells, the DE cells are contacted with CHIR99021, Dorsomorphin under growth factor-free, defined culture conditions for a period of about 1 to 4 days and then with Retinoic acid, Dorsomorphin and SANT-1 under growth factor-free, defined culture conditions for a period of about 1 to 6 days to obtain a second population of cells comprising pancreatic progenitor (PP) cells, the PP cells are contacted with Dorsomorphin, Y27632, Nicotinamide under growth factor-free, defined culture conditions for a period of about 2 to 6 days to obtain a third population of cells comprising endocrine progenitor (EP) cells, and the EP cells are contacted with Sant-1, Retinoic acid, γ-Secretase Inhibitor XXI, RepSox, and T3 under growth factor-free, defined culture conditions for a period of 7 to 21 days to obtain a fourth population of cells comprising beta cells.

Human embryonic stem cells may be obtained from established lines of human embryonic stem cells or human embryonic germ cells, such as, for example the human embryonic stem cell lines H1 and H9 (WiCell). In an embodiment, in the practice of the present methods, the iPSCs can be derived from the patient who is the intended recipient of the generated cells, tissue or organ (i.e., may be autologous), or can be derived from an individual that is matched with the patient with respect to histocompatibility considerations. The iPSCs can be generated from any adult cell. For example, suitable cells include, but are not limited to, keratinocytes, dermal fibroblasts, leukocytes derived from peripheral blood, and cells obtained in urine. The iPSCs are generated by methods known in the art.

The populations of cells provided herein can be at least 60% pure in the case of DE cells and PP cells. For example, this disclosure provides populations of each of definitive endoderm cells, pancreatic progenitor cells, endocrine progenitor cells, and beta cells, wherein the populations contain at least 60, 65, 70, 75, 80, 85, 90, 95, 96, 97, 98, 99, 99.5% DE cells, or PP cells generated under growth-factor free, defined culture conditions, and present in a composition which is growth-factor free and defined. In an embodiment this disclosure provides population of cells wherein the population contains at least 30, 35, 40, 45, 50, 55, 60, 65, or 70% EP cells generated under growth-factor free, defined culture conditions, and present in a composition which is growth-factor free and defined. In an embodiment this disclosure provides population of cells wherein the population contains at least 1, 2, 3, 4, 5, 6, 7, 8, 9, 10, 12, 15, 20, 23, 25, 28 or 30% beta cells generated under growth-factor free, defined culture conditions, and present in a composition which is growth-factor free and defined. This methods described herein can also be used for generation of cells that may produce glucagon only, and cells that may produce insulin as well as glucagon.

For culturing of cells, any medium that is routinely used for culturing animal cells can be used, except that no growth factors or serum should be present or are added in the media. Examples of suitable culture media include mTeSR1, Essential 8 medium, BME, F-12, BGJb, MCDB131, CMRL 1066, Glasgow MEM, Improved MEM Zinc Option, IMDM, Medium 199, Eagle MEM, DMEM, Ham, RPMI 1640, and Fischer's media, but other similar media can also be used. Non-growth factor additives, such as antibiotics, B-27 supplement (with or without insulin), amino acids, salts, ascorbic acid and thioglycerol can be added to the media.

Incubation conditions for cell cultures are known in the art. For example, the conditions typically include culturing at a temperature of between about 32-40° C., for example, at least or about 32, 33, 34, 35, 36, 37, 38, 39 or 40° C. The $CO_2$ concentration is generally about 1 to 10%, for example, about 2 to 7%, or about 5% or any range or value between 1 and 10%. The oxygen tension is adjusted to generally to provide normoxic conditions and is preferably about 20%.

The cells, starting with the pluripotent stem cells may be cultured on suitable substrates. For example suitable substrates include Matrigel, collagen IV, fibronectin, laminin, collagen, vitronectin, polylysine, iMatrix-511, iMatrix-521 and the like. These materials are commercially available and routinely used for cell culture.

An example of a Wnt signaling activator is CHIR 99021 (6-[[2-[[4-(2,4-Dichlorophenyl)-5-(5-methyl-1H-imidazol-2-yl)-2-pyrimidinyl]amino]ethyl]amino]-3-pyridinecarbonitrile), is an inhibitor of glycogen synthase kinase 3 (GSK-3). An example of an inhibitor of BMP signaling is Dorsomorphin (6-[4-(2-Piperidin-1-ylethoxy)phenyl]-3-pyridin-4-ylpyrazolo[1,5-a]pyrimidine). An example of a Hedgehog signaling inhibitor is SANT-1 (N-[(3,5-dimethyl-1-phenyl-1H-pyrazol-4-yl)methylene]-4-(phenylmethyl)-1-piperazinamine).

Each of the compounds described herein includes pharmaceutically acceptable salts thereof. Other compounds having these functions (i.e., functional analogs) are included within the scope of this disclosure. A "functional analog" as used herein means a compound that has a similar physical, chemical, biochemical, or pharmacological property as compared to another compound. Functional analogs may or may not have similar structures as compared to one another. For example, Dorsomorphin may be replaced with LDN193189, LDN-212854, ML347 or DMH1, CHIR9902 may be replaced with functional analogs such as AR-A014418, SB216763, TWS119, Tideglusib, AZD1080, TDZD-8, CHIR-98014, LY2090314, GSK-3 Inhibitor IX (BIO), or GSK-3 Inhibitor IX (BIO), and SANT-1 may be replaced with functional analogs such as KAAD-cyclopamine, cyclopamine, GANT61, BMS-833923.

Examples of activators of retinoic acid signaling include retinoic acid (RA), TTNPB, EC23, AM580, Ch55; examples of inhibitors of Notch signaling include XXI, DAPT, DBZ, BMS299897, Compound E, L-685458; examples of inhibitors of ROCK signaling include Y27632, H1152, GSK269962, Blebbistatin, HA1100, RKI1447; examples of protein kinase C activators include (2E,4E)-N-[(2S,5S)-1,2, 3,4,5,6-Hexahydro-5-(hydroxymethyl)-1-methyl-2-(1-methylethyl)-3-oxo-1,4-benzodiazocin-8-yl]-5-[4-(trifluoromethyl)phenyl]-2,4-pentadienamide (TPPB), 5-Chloro-N-(6-phenylhexyl)-1-naphthalenesulfonamide (SC-9), PDBu, Ingenol 3-angelate (PEP005), Bryostatin 1, Bryostatin 2, and examples of inhibitors of TGF-beta signaling include A83 01, SB431542, RepSox, SB505124, SB525334, LY364947, GW788388. These inhibitors may be used at concentrations from 0.01 to 10 µM.

The activator of Wnt signaling, CHIR99021, may be used at a concentration of from about 0.5 to about 10 µM. In an embodiment, Wnt signaling activator is used at a concentration of 2-10 µM, e.g., 2, 3, 4, 5, 6, 7, 8, 9, or 10 µM. In a preferred embodiment, the Wnt signaling activator is used at 6 µM or less, e.g., 2, 3, 4, 5, or 6 µM. The BMP inhibitor, Dorsomorphin, may be used at a concentration of from about 0.1 to about 10 µM. In an embodiment, the BMP activator is used at a concentration of 0.2 to 1 µM, e.g., 0.2, 0.3, 0.4, 0.5, 0.6, 0.7, 0.75, 0.8, 0.85, 0.9, 0.95 or 1 µM. The Hedgehog signaling inhibitor, SANT-1 may be used at a concentration of from about 0.01 to about 5 µM In an embodiment, the Hedgehog signaling inhibitor is used at a concentration of 0.1 to 0.5 µM, e.g., 0.1, 0.15, 0.2, 0.25, 0.3, 0.35, 0.4, 0.45, or 0.5 µM. Suitable concentrations for other functional inhibitors can be determined by one of skilled in the art.

In one aspect, the present invention provides a method for treating a subject suffering from, or at risk of developing, Type 1 diabetes (T1D). The method comprises culturing pluripotent stem cells, differentiating the pluripotent stem cells in vitro into beta cells or precursors thereof, and implanting the cells into the individual.

Cells may be implanted into an appropriate site in a recipient. The implantation sites include, for example, the liver, natural pancreas, renal subcapsular space, omentum, peritoneum, subserosal space, intestine, stomach, or a subcutaneous pocket. The amount of cells used in implantation depends on a number of various factors including the patient's condition and response to the therapy, and can be determined by one skilled in the art. The number of cells for transplantation may be used from 1 million to 20 million and all integer values therebetween. In embodiments, the number of cells used may be 1, 2, 5, 7.5, 10, 12.5, 15, 17.5 and 20 million cells. In an example, the differentiated beta-cell lineage cells may be implanted as dispersed cells or formed into clusters that may be infused into the hepatic portal vein. Alternatively, cells may be provided in biocompatible degradable polymeric supports, porous non-degradable devices or encapsulated to protect from host immune response. Support materials suitable for use for implantation of cells of the present disclosure include tissue templates, conduits, barriers, and reservoirs, such as those used for tissue repair. For example, synthetic and natural materials in the form of foams, sponges, gels, hydrogels, textiles, and nonwoven structures may be used.

To enhance further differentiation, survival or activity of the implanted cells in a subject, additional factors, such as growth factors, antioxidants or anti-inflammatory agents, can be administered before, simultaneously with, or after the administration of the cells.

In an aspect, this disclosure provides compositions and methods for generation of beta cells from pluripotent stem cells or cells obtained from pluripotent stem cells. For example, the disclosure provides growth-factor free differentiation protocol for generating beta cells from pancreatic progenitors. The disclosure also provides protocols for generation/conversion of cells as follows: human pluripotent stem cells to definitive endoderm cells; definitive endoderm cells to pancreatic progenitor cells. These steps may include the use of human albumin thereby making the protocols animal component free. In an embodiment, one or more steps of the entire process may include human albumin. In an embodiment, none of the steps of the entire process from pluripotent stem cells to beta cells involves any animal components.

The disclosure also provides kits for generation of cells as follows: a kit for generation of definitive endoderm cells from hPSC; a kit for generation of pancreatic progenitor cells from definitive endoderm cells; a kit for generation of endocrine progenitor cells from pancreatic progenitor cells; and a kit for generation of beta cells from endocrine progenitor cells. The kit components can comprise one or more components as described herein for the various steps. For example, the kits may comprise one or more of: Wnt signaling enhancer, BMP signaling inhibitor, Hedgehog signaling inhibitor, Retinoic acid signaling enhancer, ROCK signaling inhibitor, Notch signaling inhibitor, TGF-beta signaling inhibitor, nicotinamide, and T3.

The invention is further described by way of the figures and data presented herein, and by way of examples.

Example 1

In this example we describe that sequential treatment of hPSCs with small molecules produced a high yield of virtually (up to 98.5%) pure human PDX1+ PP1 cells under defined, growth-factor-free conditions. The method involved inducing differentiation of PSCs (such as hPSCs) to definitive endoderm (DE) cells, and subsequently the DE cells to PDX1+ PP cells under growth-factor free conditions. The hPSCs were induced to differentiate to DE cells by effecting Wnt signaling activation and BMP signaling inhibition, and further differentiation of the DE cells to PDX1+ PP1 cells by effecting Wnt signaling activation and BMP signaling inhibition, followed by Hedgehog signaling inhibition, BMP signaling inhibition, protein kinase C activation and retinoic acid. The present methods will facilitate scalable production of pancreatic cells suitable for regenerative applications as well as research.

The yield of SOX17 positive DE cells, PDX1 positive PP1 cells, and NKX6.1 positive PP2 cells by the methods described herein may be at least 60% to 99% pure. For example, the percentage of SOX17 positive DE cells, PDX1 positive PP1 cells can be 60, 65, 70, 75, 80, 85, 90, 95, 96, 97, 98, 98.5% and 99% of the cell population, the NKX6.1 PP2 cells can be at least 50% of the cell population and the proinsulin positive beta cells can be at 2-10% of the cell population, all in growth-factor free, defined media.

Materials and Methods

Maintenance of hPSCs

Human embryonic stem cells (H1, H9) and human induced pluripotent stem cells (iPSCs) (IMR90C4, 6-9-9) were maintained on iMatrix-511 (ReproCell) coated plates in mTeSR1 medium (STEMCELL Technologies).

Growth-Factor-Free Differentiation of hPSCs to PDX1+ PP1 Cells

When hPSCs maintained on iMatrix-511-coated surface achieved 70-80% confluence, pancreatic PDX1+ cell differentiation was initiated.

Stage 1: On day 0, medium was changed with RPMI supplemented with 1 µM Dorsomorphin (DM) and 2-10 µM CHIR99021(CH). At day 1-4, medium was changed with RPMI supplemented with B-27 without insulin.

Stage 2: On day 4, the cells were dissociated into single cells with Accutase for 10 min and then replated onto iMatrix-511-coated plates in S2 media supplemented with 5 µM Y-27632 (optional). S2 medium was constituted with a Serum-free differentiation (SFD) medium supplemented with 2 µM CHIR99021 and 0.75 µM DM. SFD was composed of 75% IMDM, 25% Ham's F12 medium, 0.5% N2, 1% B-27, 1% Penicillin-Streptomycin, 0.05% BSA Fraction V, 2 mM GlutaMAX, 0.5 mM Ascorbic acid ($V_c$), 0.45 mM 1-Thioglycerol.

Stage 3: On day 7-11, medium was replaced with DMEM+1% B-27+50 µg/ml $V_c$, supplemented with 0.25 µM SANT-1, 2 µM retinol acid, 0.2 µM PDBu, and 0.75 µM DM. Medium was changed daily. After stage 3, PDX1+ PP1 cells were generated.

Stage 4: On day 11-15, medium was replaced with DMEM+1% B-27+50 µg/ml $V_c$, supplemented with 50-100 µM Y27632, 10 mM Nicotinamide, and 0.75 µM DM. Medium was changed daily. After stage 4, NKX6.1+ PP2 cells were generated.

Stage 5: NKX6.1+ PP2 cells were further differentiated into beta cells by treating cells using S5 medium supplemented with 0.25 µM SANT-1, 1 µM XXI, 10 µM RepSox, and 1 µM T3, 10 mg/l Heparin, and 10 µM Zinc Sulfate for 6 days. After that, cells were treated by ESFM until day 30.

Flow Cytometry Analysis

Cells were dissociated into single cells with Accutase for 10 min and then fixed with 1% paraformaldehyde for 30 min at room temperature and stained with primary and secondary antibodies in PBS plus 0.1% Triton X-100 and 0.5% BSA. Data were collected on a BD ACCURI C6 PLUS flow cytometer (BD Biosciences) and analyzed using FlowJo 10. FACS gating was based on the corresponding isotype antibody control.

Immunostaining

Cells were fixed with 4% paraformaldehyde for 15 min at room temperature and then stained with primary and secondary antibodies in PBS plus 0.4% Triton X-100 and 5% non-fat dry milk. Nuclei were stained with Gold Anti-fade Reagent with DAPI. A Nikon epifluorescence microscope was used for imaging analysis.

Results

DE Differentiation Requires Endogenous TGFβ/Activin Signaling

To understand RNA expression profile during CH induced differentiation, we collected cells following CH treatment every three hours for a total of eight different time points after differentiation (FIG. 1A). RNA-seq analysis of these samples showed that RNA expression of several components in the TGF-β signaling pathway increased over the course of 21 hours (FIG. 1A). We observed that Nodal expression was upregulated 21 hours after activation of Wnt signaling induced by CHIR99021 treatment.

Growth-Factor-Free Differentiation of hPSCs to SOX17+ DE Cells

Beta cell differentiation from hPSCs is considered to undergo four successive stages (definitive endoderm, pancreatic progenitors, endocrine progenitors, and beta cells). The definitive endoderm (DE) differentiation for all previous protocols requires growth factors from the TGF-beta signaling pathway (Activin A or GDF8) to initiate this differentiation.

Here we describe a differentiation protocol without using any growth factors. We first initiated DE differentiation by treating hPSCs with CH+DM. To determine optimal CH concentration for DE differentiation, H1 cells were treated by 2 to 10 µM CH in RPMI for 24 hours, followed by 3 days culture in RPMI with 2% B-27 minus insulin supplement. We analyzed the percentage of SOX17+ cells on day 4 of differentiation via flow cytometry. CH treatment induced DE differentiation in a dose-dependent manner. The optimal DE differentiation was achieved when hPSCs were treated by 4 or 6 µM CH (FIG. 1C). On day 4, 85% of cells expressing SOX17 when cells were treated with 6 µM CH plus 1 µM DM, whereas the percentage of cells expressing SOX17 decreased to 20% when treated with 10 µM CH plus 1 µM DM (FIG. 1C). Immunostaining of day 4 cells differentiated by 6 µM CH plus 1 µM DM also showed the majority of cells expressed SOX17 (FIG. 1D). Next, the dynamics of DE differentiation was investigated by analyzing SOX17 expression from day 1 to day 4. During differentiation, SOX17+ cells increased from 0% on day 1 to 78% on day 4, indicating DE was gradually developed (FIG. 1E). Furthermore, to evaluate whether our novel DE differentiation protocol depends on endogenous TGFbeta pathway, we differentiated H1 hESCs with CH, CH+DM, and CH+A83-01 (a TGFbeta inhibitor). Our results showed that inhibition of endogenous TGFbeta abolished DE differentiation, whereas inhibition of BME pathway promoted this differentiation (FIG. 1F).

Growth-Factor-Free Differentiation of SOX17+ DE Cells to PDX1+ PP1 Cells

Figure 3:
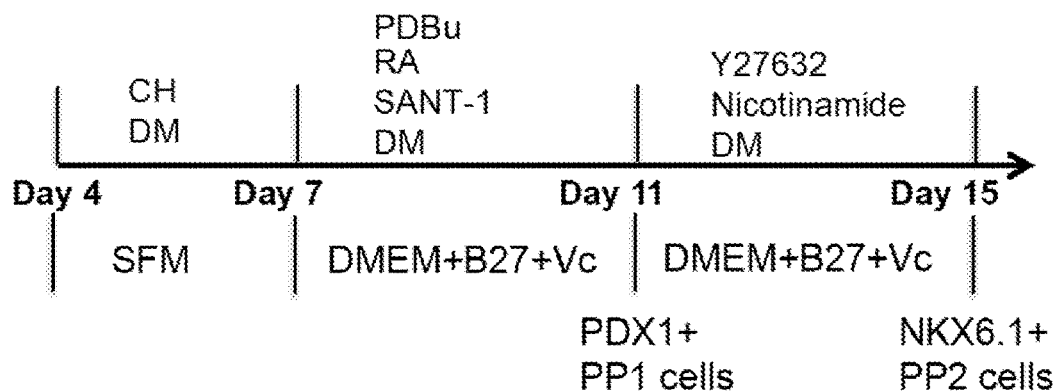
FIG. 3. Growth-factor-free differentiation of DE cells to PDX1+ PP1 cells. (A) Schematic of protocol for defined, growth-factor-free differentiation of DE cells to PDX1+ PP1 cells and NKX6.1+ PP2 cells. (B-C) H1 cells were cultured as indicated in FIG. 1B with 6 μM CH plus 1 μM DM treatment. At day 11 of differentiation, cells were analyzed for PDX1 expression by immunostaining (B) and flow cytometry (C). Scale bar is 100 μm. (D-E) H9 hESCs (D), and IMR90C4 iPSCs (E) were differentiated as indicated in FIG. 1B with 1 μM DM plus 3 μM CH and 4 μM CH treatment respectively. At day 11, cells were analyzed for PDX1 expression by flow cytometry. (F-H) IMR90C4 iPSC-derived PP1 cells (F), H9 hESC-derived PP1 cells (G), and H1 hESC-derived PP1 cells (H) were differentiated with Y27632, Nicotinamide, and DM for four days. At day 15, cells were analyzed for Nkx6.1 expression by immunofluorescence.
Figure 3:
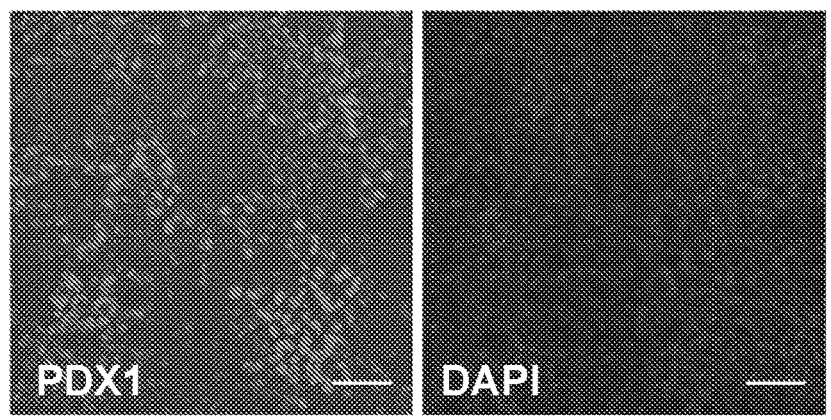
Figure 3:
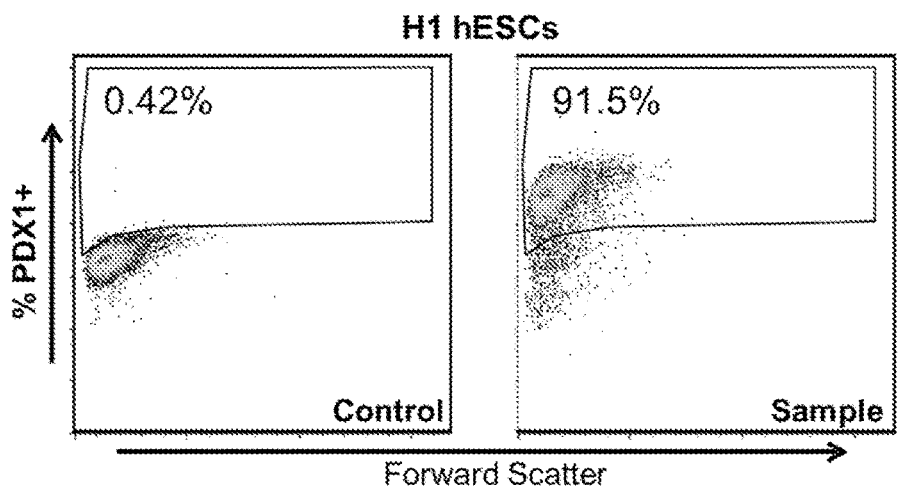
Figure 3:
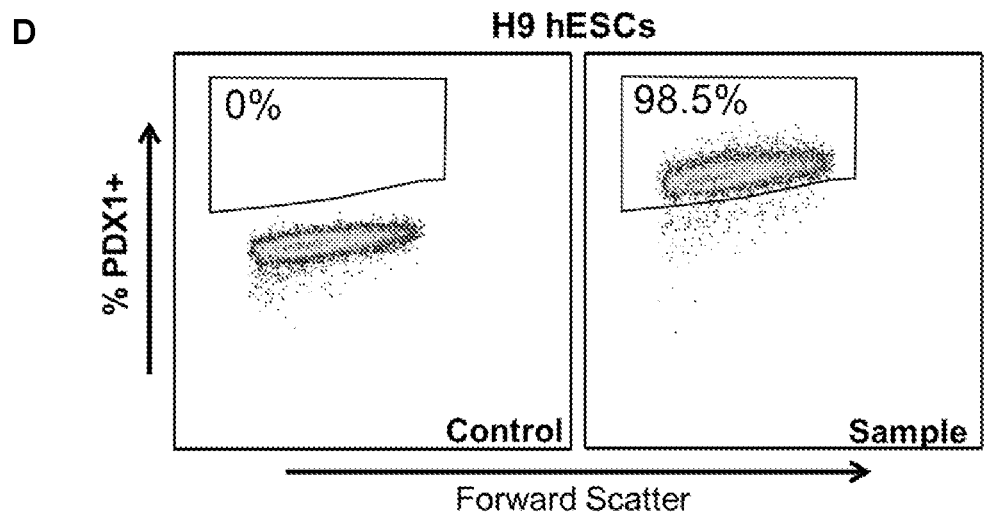
Figure 3:
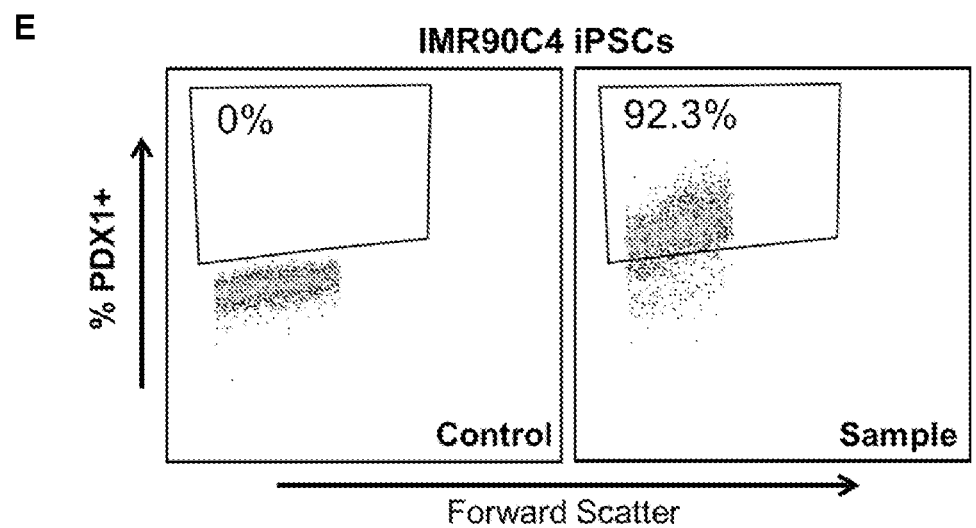
Figure 3:
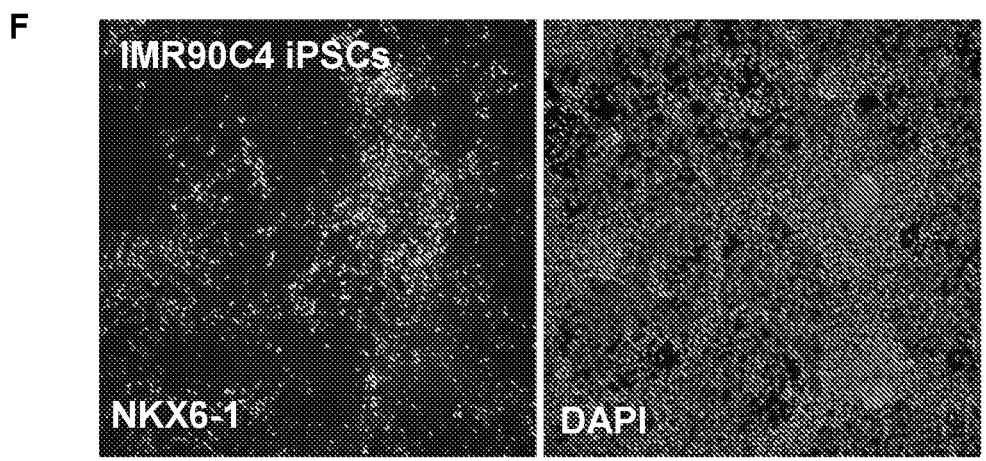
Figure 3:
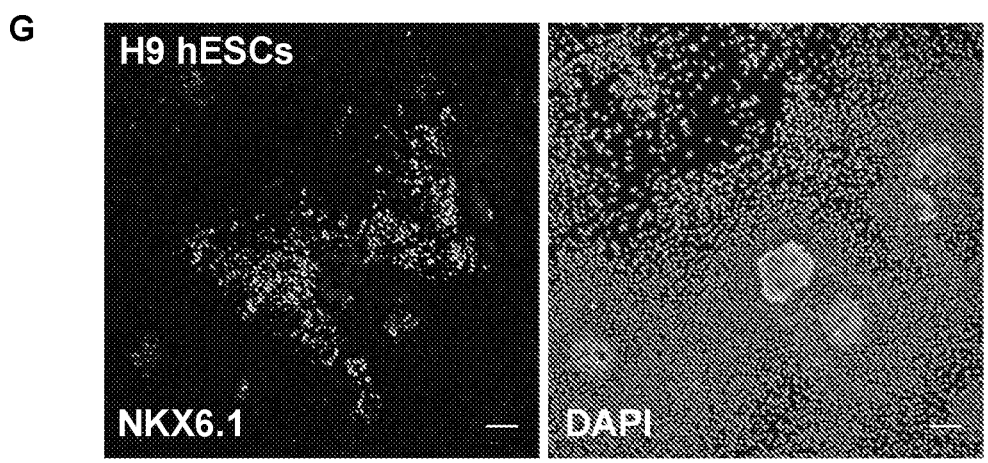
Figure 3:
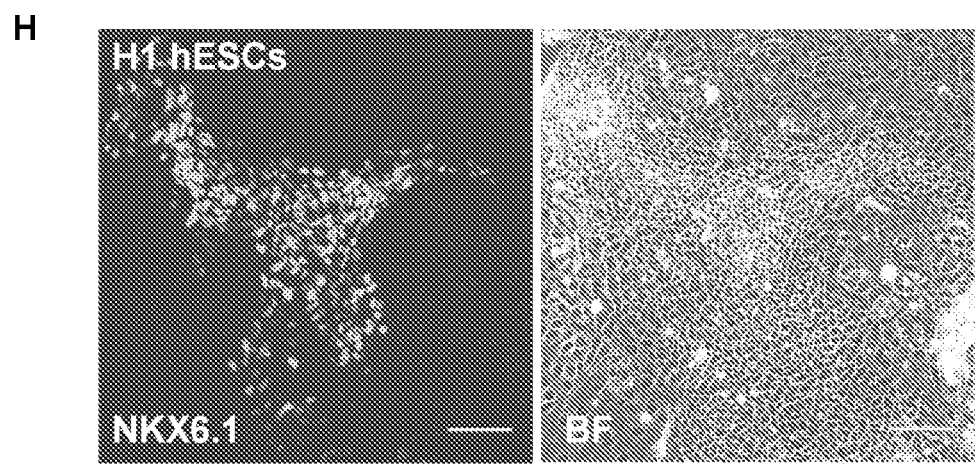

On day 4 of differentiation, our differentiated cells usually reach 100% confluency. Therefore, we decided to dissociate our day 4 SOX17+ DE cells with Accutase and replated our cells at a 1:4 to 1:6 passaging ratio. To assess the differentiation competency of hPSC-derived DE cells to further differentiate into PDX1+ PP1 cells, we treated the cells with DM and CH for 3 days followed by another 4-day DM, SANT-1, PDBu and Retinoic Acid (RA) treatment. On day 11 of differentiation, cells differentiated from H1 hESCs were fixed. Immunostaining of day 11 cells with a PDX1 antibody showed that DE cells were successfully differentiated into PDX1+ PP1 cells (FIG. 3B). Flow cytometry analysis of day 11 differentiated cells from H1 hESCs demonstrated that more than 91% cells expressing PDX1 (FIG. 3C). When we differentiated H9 hESCs and IMR90C4 iPSCs to PDX1 PP cells, we achieved 98.5% and 92.3% PDX1+ cells on day 11 of differentiation respectively.

To evaluate the differentiation competency of hPSC-derived PDX1+ PP1 cells to further differentiate into NKX6.1+ PP2 cells, we treated our PDX1+ PP1 cells with Y27632, nicotinamide and DM for 4 days. On day 14 of differentiation, cells differentiated from IMR90C4 iPSCs, H9 and H1 hESCs were fixed. Immunostaining of NKX6.1 showed that PDX1+ PP1 cells could differentiate into NKX6.1+ PP2 cells (FIG. 3F-H).

Figure 2:
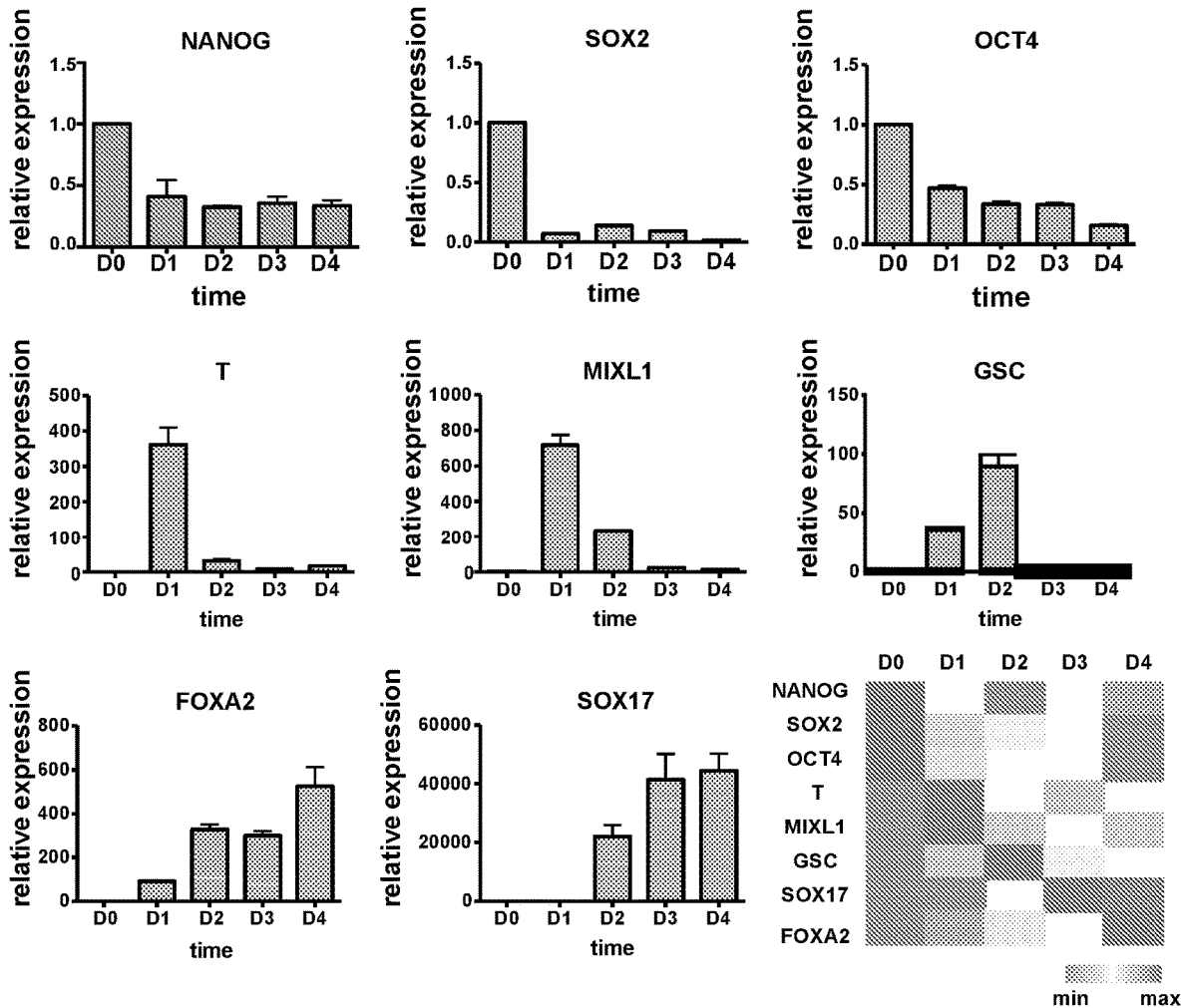
FIG. 2. Characterization of key transcription factor mRNA expression during DE differentiation and the potential of further lineage specification of acquired DE cells. (A-C) H1 hESCs were differentiated with CH and DM. (A) From day 0 to day 4, cells were analyzed for gene expression by quantitative PCR (qPCR). (B) On day 4 of differentiation, cells were immunostained with a FOXA2 antibody. (C) On day 4 of differentiation, cells were analyzed for FOXA2 expression by flow cytometry. (D) CH and DM induced DE cells were further differentiated for 3 days to generate liver bud (LB) cells. From day 4 to day 7, cells were collected and qPCR analyses of AFP, HNF4A and TBX3, markers of LB, were performed.
Figure 2:
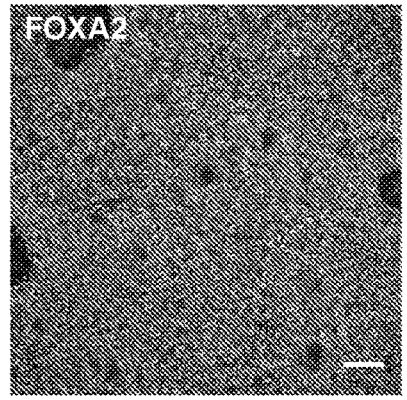
Figure 2:
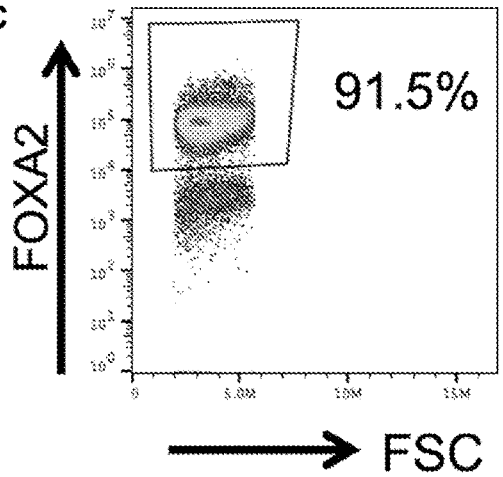
Figure 2:
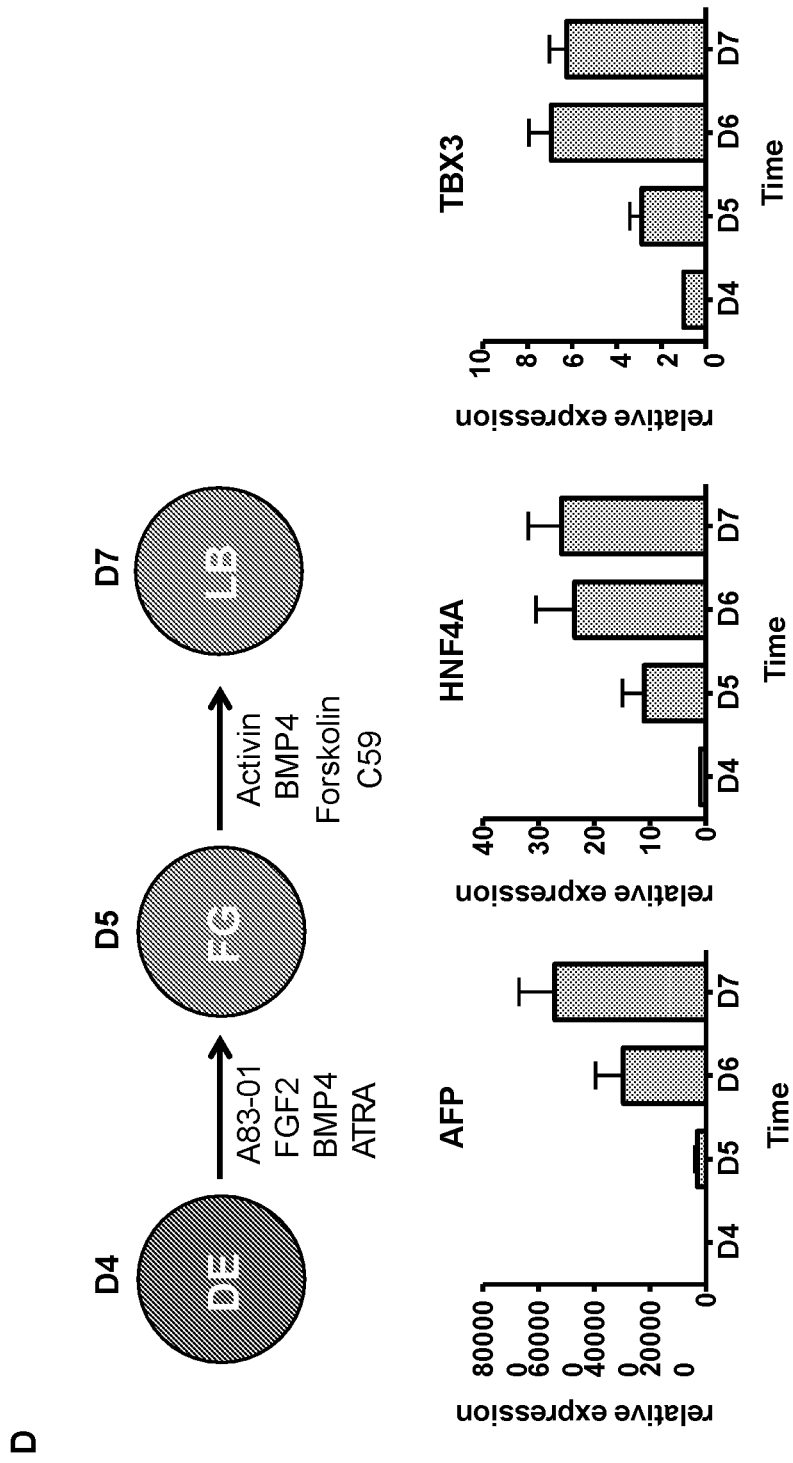

To understand CH+DM induced DE differentiation, we characterized this differentiation process by profiling the expression of key genes during DE differentiation and testing DE cell capacity to differentiate into more specified lineages. We collected cells from day 0 to day 4 samples and performed qPCR analyses. Based on results from qPCR, cells tended to lose the expression of genes that are related to cell pluripotency like Nanog, Sox2, and Oct4 after differentiation. Genes involved in gastrulation like Brachury (T), MIXL1, or GSC, were significantly activated only on D1 or D2. The endodermal markers such as FOXA2 or SOX17, were gradually upregulated, indicating the successful generation of DE population (FIG. 2A). Immunostaining (FIG. 2B) and flow cytometry (FIG. 2C) confirmed that day 4 cells expressed FOXA2. Then we continued to induce the derived DE cells into liver lineages with published protocols. qPCR analysis revealed the upregulation of markers of liver bud cells such as AFP, HNF4A and TBX3 (FIG. 2D), indicating DE cells could further differentiate into liver bud lineages.

Discussion

We have successfully induced DE differentiation from hPSCs without the use of Activin A via small molecule-mediated activation of Wnt signaling pathway. Furthermore, our Sox17+ DE cells were able to give rise to a high yield of virtually (up to 98%) pure Pdx1+ cells without any growth factors. High concentrations of Activin A or GDF8 (e.g. 100 ng/ml) were usually used to induce DE cells in all previous pancreatic differentiation protocols. Here we have demonstrated that small molecules CHIR99021 and Dorsomorphin can be used to promote DE differentiation of multiple hPSCs, and we found that 24-hour treatment was sufficient for initiation of DE differentiation.

We also found that DE differentiation is CH concentration dependent. For example, 10 µM CH treatment only generated 6% Sox17+ cells, whereas 4 or 6 µM CH treatment yielded more than 74% Sox17+ cells. When treated with 10 µM, the differentiated cells might become mesoderm rather than endoderm, causing the SOX17 expression to decrease.

We have achieved the DE differentiation with small molecules. Differentiation of DE cells into Pdx1+ PP cells was more efficient if we passaged our cell on day 4. We found that cell density and cell-cell contact were important factors in pancreatic differentiation. A split ratio between 1:4 and 1:6 is considered as optimal for PP differentiation. We have achieved 98% Pdx1+ PP cells using H9 hESCs in 10 days.

The robust ability to generate a high yield of virtually pure PP cells under defined, growth-factor-free conditions solely by chemically mediated manipulation of cell signaling pathways should facilitate scalable production of pancreatic cells suitable for research and regenerative applications.

Example 2

This example provides a method which does not rely on high (or any) concentrations of Activin A, FGF2, FGF10 and/or FGF7, which substantially increases the cost of beta cell biomanufacturing. The large-scale and cost-effective production of quality-controlled PPs and beta cells from hPSCs for use in cell therapy and drug discovery can ideally require a chemically defined, growth-factor-free differentiation system. Here we used a bio-inspired approach to optimize small molecules of developmental cell signaling pathways and developed a chemically defined and growth-factor-free differentiation protocol for generating PPs from hPSCs. We achieved more than 95% PDX1+ PPs in 10 days of differentiation, and 71% NKX6-1+ PPs in 14 days of differentiation without any growth factors from hPSCs. Our findings should facilitate the ongoing development of beta cell-based therapies for treating diabetes.

We provide two examples of pancreatic differentiation kits, v1 and v2. We included animal components (bovine serum albumin) during Stage 1&2 differentiation in kit version 1. However, in kit version 2, we do not have any animal components during Stage 1&2 differentiation. The following differentiation protocol was developed based on 6-well plate platform.

Pancreatic Differentiation version 1 (with animal protein for stage 1 & 2):

Stage 1 (Definitive Endoderm)

Day 0: Add 2 ml RPMI media per well, supplemented with 6 µM CHIR99021 plus 1 µM Dorsomorphin.

Day 1 to Day 3: Change media and add 2 ml RPMI+B-27 (without insulin) media per well Stage 2 (Posterior Foregut)

Day 4 to Day 6: Change media and add 2 ml SFD media per well, supplemented with 2 µM CHIR99021 and 0.75 µM Dorsomorphin.

Prepare Serum-free differentiation (SFD) media by mixing 75% IMDM, 25% Ham's F12 medium, 0.5×N2, 0.5× B-27 (with insulin), 1% Penicillin/Streptomycin, 0.05% BSA Fraction V, 2 mM Glutamax, 0.5 mM ascorbic acid, $4.5 \times 10^{-4}$ M 1-Thioglycerol (MTG).

Stage 3 (Pancreatic Progenitor 1)

Day 7 to day 11: medium was replaced with DMEM+1% B-27+50 µg/ml ascorbic acid, supplemented with 0.25 µM SANT-1, 2 µM retinoic acid, 0.2 µM PDBu, and 0.75 µM DM. Medium was changed daily. Add 2 ml medium per well.

Stage 4 (Pancreatic Progenitor 2)

Day 11 to day 14: medium was replaced with DMEM+1% B-27+50 µg/ml ascorbic acid, supplemented with 50 to 100 µM Y27632, 10 mM Nicotinamide, and 0.75 µM DM. Medium was changed every other day. Add 2 ml medium per well. On day 15, NKX6.1+ PP2 cells will be generated with an efficiency of more than 70% based on flow cytometry analysis.

Pancreatic Differentiation version 2 (with human protein for stage 1 & 2):

Stage 1 (Definitive Endoderm)

Day 0: Add 2 ml RPMI media per well, supplemented with 6 µM CHIR99021 plus 1 µM Dorsomorphin Day 1 to Day 3: Change media and add 2 ml RPMI+ 0.05% human serum albumin (HAS)+200 µg/ml ascorbic acid per well daily.

Stage 2 (Posterior Foregut)

Day 4 to Day 5: Change media and add RPMI+0.05% HSA+200 µg/ml ascorbic acid per well daily.

Stage 3 (Pancreatic Progenitor 1)

Day 6 to day 9: medium was replaced with DMEM+1% B-27+50 µg/ml ascorbic acid, supplemented with 0.25 µM SANT-1, 2 µM retinoic acid, 0.2 µM PDBu, and 0.75 µM DM. Medium was changed daily. Add 2 ml medium per well.

Stage 4 (Pancreatic Progenitor 2)

Day 10 to day 13: medium was replaced with DMEM+1% B-27+50 µg/ml ascorbic acid, supplemented with 50 to 100 µM Y27632, 10 mM Nicotinamide, and 0.75 µM DM. Medium was changed every other day. Add 2 ml medium per well.

On day 14, NKX6.1+ PP2 cells will be generated with an efficiency of more than 70% based on flow cytometry analysis.

Beta Cell Differentiation

Day 14 to Day 20: Prepare Stage 5 medium: DMEM+1% B-27+50 µg/ml ascorbic acid, supplemented with 1 µM T3, 10 µM ALK5 inhibitor (RepSox), 10 µM Zinc Sulfate, 10 µg/ml heparin, 0.1 µM Dibenzazepine (γ-Secretase Inhibitor XX) (or 1 µM γ-Secretase Inhibitor XXI), and 10 µM Y27632. Change medium with 2 ml new medium per well every other day.

Day 21 to Day 35: Change medium every other day with ESFM.

To make ESFM, add 0.23 g Glucose, 10.5 g BSA, 84 µg $ZnSO_4$, 5 mg heparin, 5.2 ml GlutaMAX, 5.2 ml MEM Non-Essential Amino Acids, 5.2 ml Penicillin/Streptomycin, 523 µl Trace Elements A, 523 µl Trace Elements B into 500 ml MCDB131 (Corning 15-100-CV).

Figure 4:
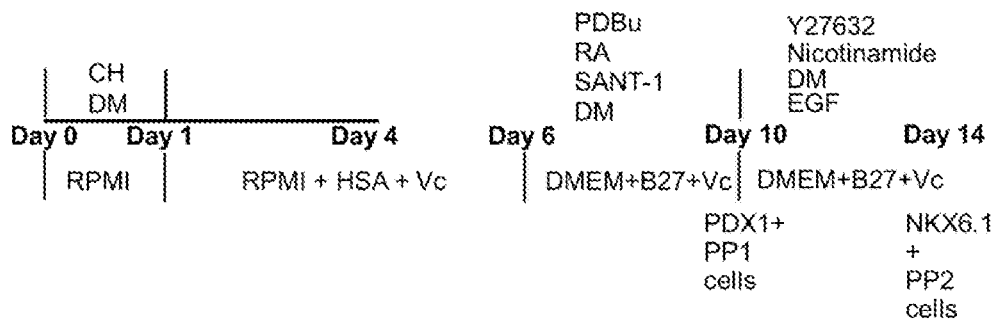
FIG. 4. Differentiation of PDX1+ PP1 cells into Nkx6.1 PP2 cells and beta cells. (A) Schematic of version 2 protocol for defined, growth-factor-free differentiation of DE cells, PP1 and PP2 cells. (B) H1 derived PP1 cells were treated with Y27632, Nicotinamide, DM in the presence or absence of EGF. On day 14 of differentiation, cells were analyzed for NKX6.1 expression by flow cytometry. (C) Schematic of protocol for differentiation of PP2 cells into beta cells. (D) H1 derived day 30 cells were immunostained with a proinsulin antibody (left panel—green) and a proglucagon antibody (middle panel—red). A merged image (right panel—green, red, yellow) showing both stains is also shown. (E) Representative ELISA measurements of secreted human insulin from hPSC-derived day 30 cells challenged sequentially with 2.5, 20, 2.5, 20 mM glucose.
Figure 4:
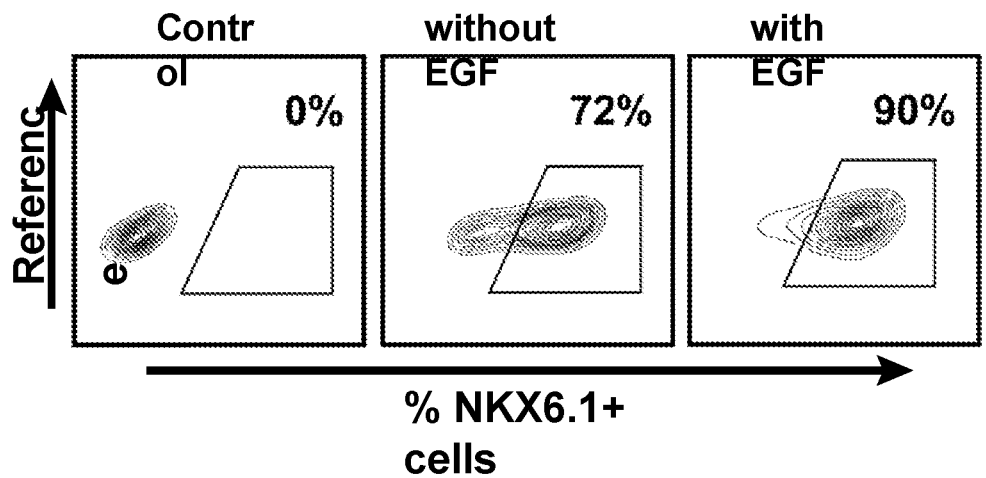
Figure 4:
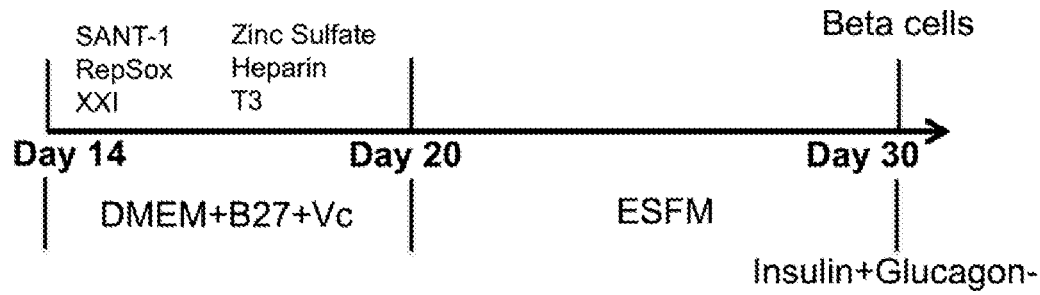
Figure 4:
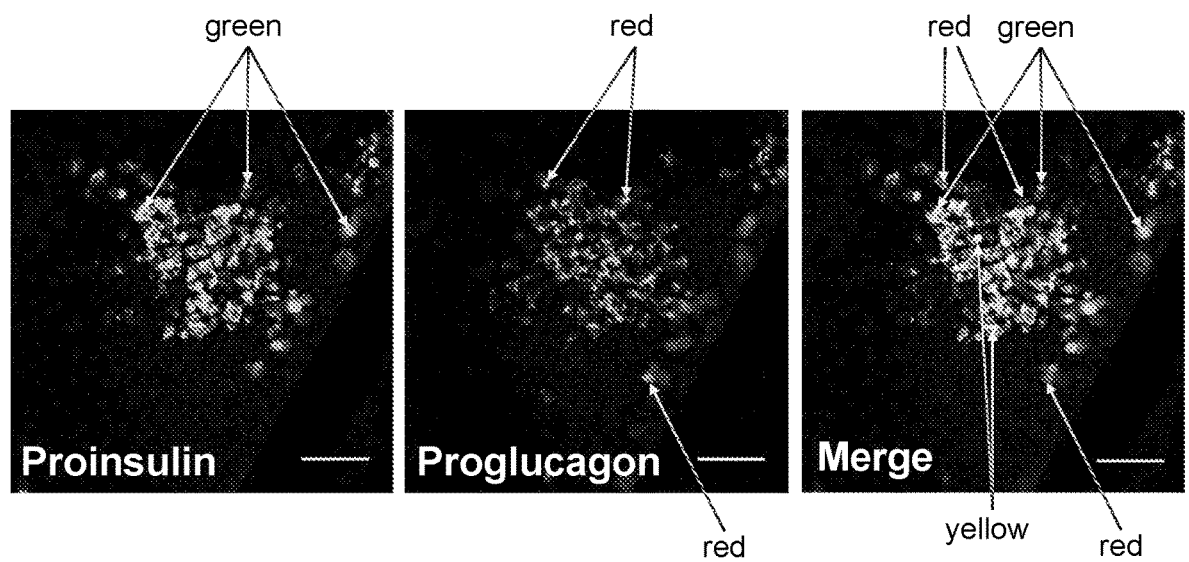
Figure 4:
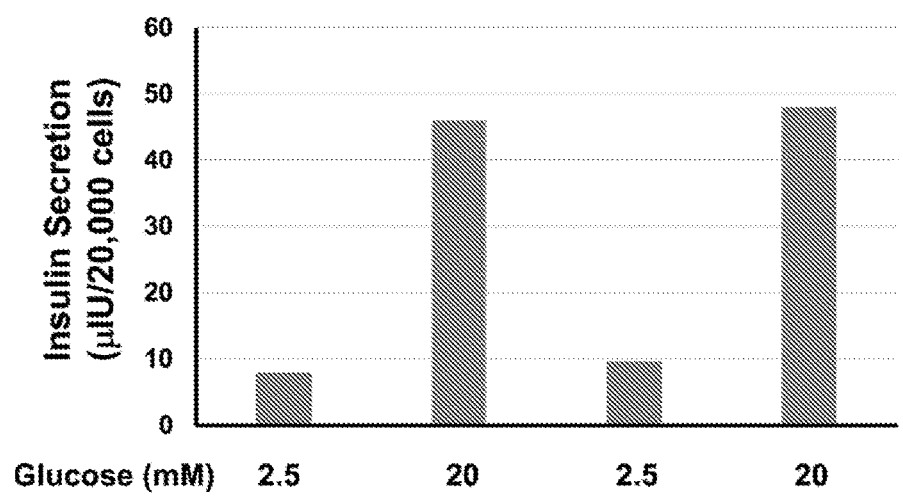

The results are shown in FIG. 4. Cells that produced only insulin were seen following staining for proinsulin (FIG. 4D). Some cells also stained for only glucagon (red) and upon merging the two immunostained images, some cells were seen as yellow representing cells that were likely producing both insulin and glucagon. However, many cells can be identified that produced insulin only (green). The insulin producing beta cells were challenged with different amounts of glucose. FIG. 4E shows that the amount of insulin produced varied corresponding to increasing or decreasing concentration of glucose in the medium.

While the invention has been described through illustrative examples, routine modifications will be apparent to those skilled in the art and such modifications are intended to be within the scope of the invention.

The invention claimed is:

1. A method of generating cells of pancreatic beta lineage from pluripotent stem cells comprising:
   a) contacting the cells with a growth-factor free medium comprising a Wnt signaling activator that is CHIR99021 and is present in the growth-factor free medium in a concentration of 2 to 6 µM, and a bone morphogenetic protein (BMP) signaling inhibitor that is Dorsomorphin to obtain a population of definitive endoderm (DE) cells, and wherein more of the DE cells contacted with 2 to 6 µM CHIR99021 are Sox17+ relative to DE cells contacted with CHIR99021 in the same growth-factor free medium but wherein the concentration of CHIR99021 is at least 10 µM, and wherein said DE cells that are contacted with the 2 to 6 µM of the CHIR99021 are obtained in a period of approximately 4 days,
   b) contacting the DE cells with a growth-factor free culture medium comprising Wnt signaling activator that is CHIR99021, the BMP signaling inhibitor that is Dorsomorphin, a retinoic acid signaling activator, and a protein kinase C activator, and a Hedgehog signaling inhibitor to obtain a population of pancreatic progenitor 1 (PP1) cells wherein more than 91% of the PP1 cells are PDX1+,
   c) subjecting the PP1 cells to a growth-factor free medium culture medium comprising a BMP signaling inhibitor that is Dorsomorphin, a ROCK signaling inhibitor, and nicotinamide to obtain a population of pancreatic progenitor 2 (PP2) NKX6.1+ cells,
   d) subjecting the PP2 cells to Hedgehog signaling inhibitor, a retinoic acid signaling activator, a Notch signaling inhibitor, a TGF-beta signaling inhibitor, and 3,3', 5-Triiodo-L-thyronine (T3) to obtain a population of endocrine progenitor (EP) cells,
   e) and culturing the EP cells in growth-factor free, serum-free medium to obtain beta cells, wherein the beta cells produce insulin.

2. The method of claim 1, wherein the Hedgehog signaling inhibitor is SANT-1.

3. The method of claim 1, wherein the secretion of insulin by the beta cells increases with increasing concentration of glucose in the culture medium.

4. A method of generating beta cells from pluripotent stem cells (PSCs) comprising:
   a) culturing PSCs in a medium comprising a GSK3β inhibitor that is CHIR99021 and a bone morphogenetic protein (BMP) signaling inhibitor that is Dorsomorphin for a period of from 4 to 10 days to obtain definitive endoderm (DE) cells;
   b) culturing DE cells in a medium comprising a GSK3β inhibitor that is CHIR99021, the BMP signaling inhibitor that is Dorsomorphin, and a Hedgehog signaling inhibitor for a period of 2 to 6 days to obtain pancreatic progenitor 1 (PP1) cells;
   c) culturing PP1 cells in a medium comprising the BMP signaling inhibitor that is Dorsomorphin for a period of 2 to 6 days to obtain pancreatic progenitor 2 (PP2) cells;
   d) culturing PP2 cells in a medium comprising 3',5-Triiodo-L-thyronine (T3), and the Hedgehog signaling inhibitor, a retinoic acid signaling activator, a Notch signaling inhibitor, and a TGF-beta signaling inhibitor for a period of 5-10 days to obtain endocrine progenitor (EP) cells, and
   e) culturing EP cells in growth-factor-free, defined medium for 10-20 days to obtain beta cells,
   wherein steps a), b), c) and d) are carried out under growth-factor free, defined culture conditions.

* * * * *